United States Patent
Yokota

(10) Patent No.: US 11,947,113 B2
(45) Date of Patent: Apr. 2, 2024

(54) MOVABLE DEVICE, IMAGE PROJECTION APPARATUS, HEAD-UP DISPLAY, LASER HEADLAMP, HEAD-MOUNTED DISPLAY, OBJECT RECOGNITION DEVICE, AND VEHICLE

(71) Applicant: RICOH COMPANY, LTD., Tokyo (JP)

(72) Inventor: Wataru Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 40 days.

(21) Appl. No.: 17/023,600

(22) Filed: Sep. 17, 2020

(65) Prior Publication Data

US 2021/0132385 A1    May 6, 2021

(30) Foreign Application Priority Data

Oct. 30, 2019 (JP) ................. 2019-197896

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0858* (2013.01); *G02B 27/0031* (2013.01); *G02B 27/18* (2013.01); *G02B 2027/0183* (2013.01)

(58) Field of Classification Search
CPC .............. G02B 26/0858; G02B 26/101; G02B 2027/0178; G02B 2027/0183;
(Continued)

(56) References Cited

U.S. PATENT DOCUMENTS

2008/0144154 A1* 6/2008 Asai ................... G02B 26/0858
359/224.1
2010/0309536 A1* 12/2010 Akanuma .......... G02B 26/0858
359/200.8
(Continued)

FOREIGN PATENT DOCUMENTS

JP    2003-057586    2/2003
JP    2007-310196    11/2007
(Continued)

OTHER PUBLICATIONS

Japanese Office Action dated May 9, 2023, in corresponding Japanese Patent Application No. 2019-197896, 4pp.

*Primary Examiner* — Ram A Mistry
(74) *Attorney, Agent, or Firm* — XSENSUS LLP

(57) ABSTRACT

A movable device includes a movable part including a mirror unit; a torsion bar with one end coupled to the movable part; a first cantilever part coupled to the other end of the torsion bar; a second cantilever part with one end coupled to a coupling portion of the first cantilever part; a stationary part coupled to the other end of the second cantilever part; and a driver configured to deform the second cantilever part. A width of the coupling portion of the first cantilever part, to which the second cantilever part is coupled, is narrower than a width of the second cantilever part in a width direction of the coupling portion.

17 Claims, 19 Drawing Sheets

(51) Int. Cl.
*G02B 27/00* (2006.01)
*G02B 27/18* (2006.01)

(58) Field of Classification Search
CPC ............ G02B 27/0031; G02B 27/0101; G02B 27/0172; G02B 27/18; B81B 2201/032; B81B 2203/0154; B81B 2203/058; B81B 3/0043; G01S 17/88; G01S 17/89; G01S 17/93; G01S 17/931; G01S 7/4817; G03B 21/008
See application file for complete search history.

(56) References Cited

U.S. PATENT DOCUMENTS

| | | | | |
|---|---|---|---|---|
| 2011/0292479 | A1* | 12/2011 | Hiraoka | G02B 26/0858 359/199.1 |
| 2013/0314711 | A1* | 11/2013 | Cantin | G01S 17/10 356/445 |
| 2018/0039074 | A1 | 2/2018 | Oyama et al. | |

FOREIGN PATENT DOCUMENTS

| | | |
|---|---|---|
| JP | 2010-237520 A | 10/2010 |
| JP | 2011-018026 | 1/2011 |
| JP | 2011-232589 A | 11/2011 |
| JP | 2013-057819 | 3/2013 |
| JP | 2013-080208 | 5/2013 |
| JP | 2014-182189 | 9/2014 |
| JP | 2016-206235 A | 12/2016 |
| JP | 2017-207630 | 11/2017 |
| JP | 2017-211576 | 11/2017 |
| JP | 2019-82634 A | 5/2019 |
| WO | WO2002/073126 A1 | 9/2002 |

* cited by examiner

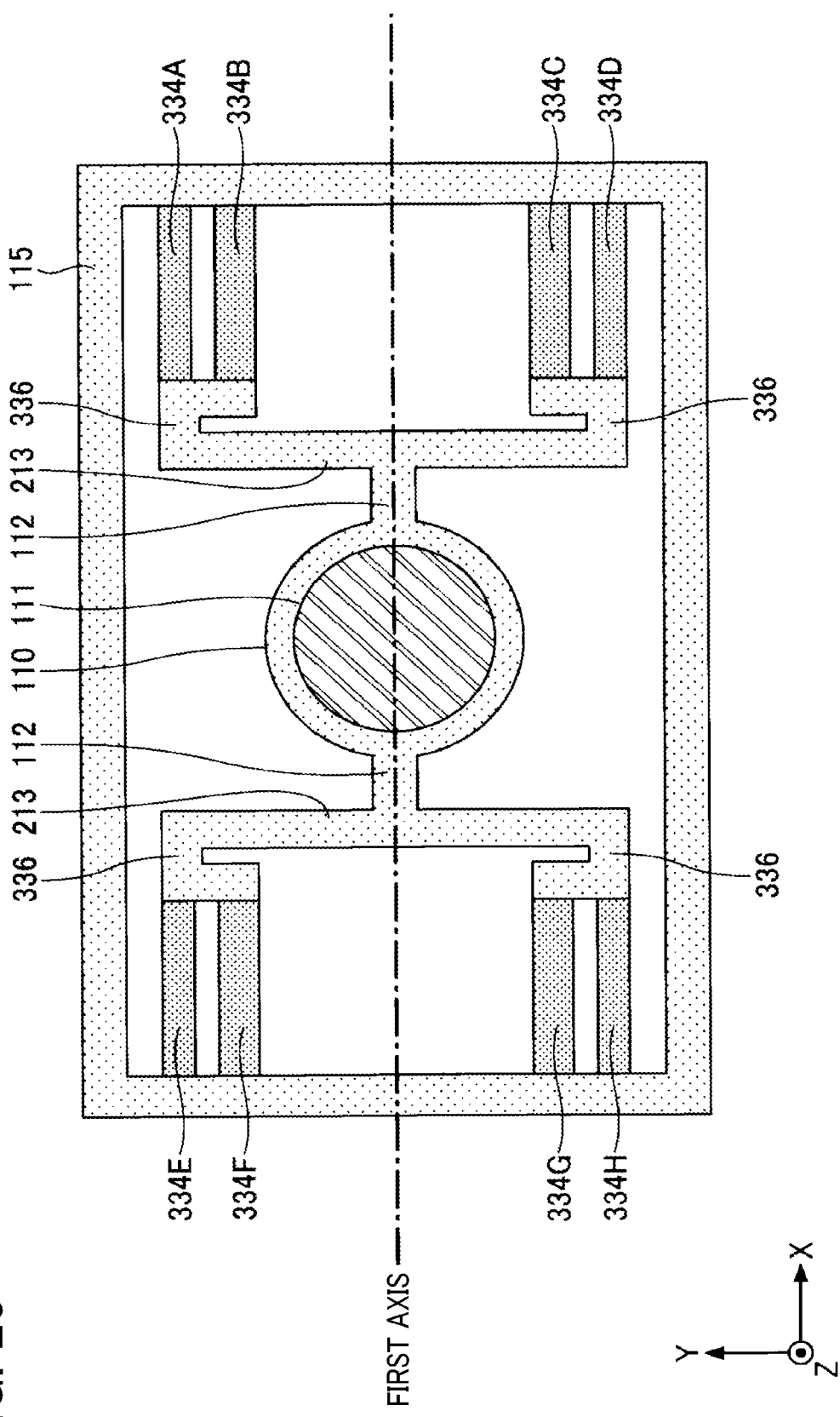

MOVABLE DEVICE, IMAGE PROJECTION APPARATUS, HEAD-UP DISPLAY, LASER HEADLAMP, HEAD-MOUNTED DISPLAY, OBJECT RECOGNITION DEVICE, AND VEHICLE

CROSS-REFERENCE TO RELATED APPLICATIONS

This patent application is based on and claims priority pursuant to 35 U.S.C. § 119(a) to Japanese Patent Application No. 2019-197896, filed on Oct. 30, 2019, in the Japan Patent Office, the entire disclosure of which is hereby incorporated by reference herein.

BACKGROUND

Technical Field

Embodiments of the present disclosure relate to a movable device, an image projection apparatus, a head-up display (HUD), a laser headlamp, a head-mounted display (HMD), an object recognition device, and a vehicle.

Related Art

In recent years, the development of light deflectors using the micro-electromechanical systems (MEMS) technology is being actively pursued. Such light deflectors are produced as a compact scanner to be mounted on an image display apparatus typified by a projector or a sensing device typified by a light detection and ranging (LiDAR) device. The light deflectors are becoming commercially practical for some applications. There is a demand for light deflectors used for that purposes to include a mirror with a diameter of 1 millimeters (mm) or more and a deflection angle of 10 degrees or more, and the mirror size and the deflection angle of such light deflectors are both more likely to increase than those of typical light deflectors used in optical communication.

SUMMARY

In one aspect of this disclosure, there is described a movable device including a movable part including a mirror unit; a torsion bar with one end coupled to the movable part; a first cantilever part coupled to the other end of the torsion bar; a second cantilever part with one end coupled to a coupling portion of the first cantilever part; a stationary part coupled to the other end of the second cantilever part; and a driver configured to deform the second cantilever part. A width of the coupling portion of the first cantilever part, to which the second cantilever part is coupled, is narrower than a width of the second cantilever part in a width direction of the coupling portion.

In another aspect of this disclosure, there is described an image projection apparatus including a light source configured to emit light; and the movable device. The movable device deflects the light emitted from the light source so as to project an image of the light.

In still another aspect of this disclosure, there is described a head-up display including the movable device.

In yet another aspect of this disclosure, there is described a laser headlamp including the movable device.

Further described is a head-mounted display including the movable device.

Still further described is an object recognition device including a light source configured to emit light: and the movable device. The movable device deflects the light emitted from the light source to an object. The object recognition device is configured to detect light reflected from the object to recognize the object.

Yet further described is a vehicle including the head-up display.

In another aspect of this disclosure, there is described a vehicle including the laser headlamp.

In still another aspect of this disclosure, there is described a vehicle including object recognition device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 23 is a diagram of a configuration of a light deflector as a movable device according to a fourth embodiment.

Figure 1:
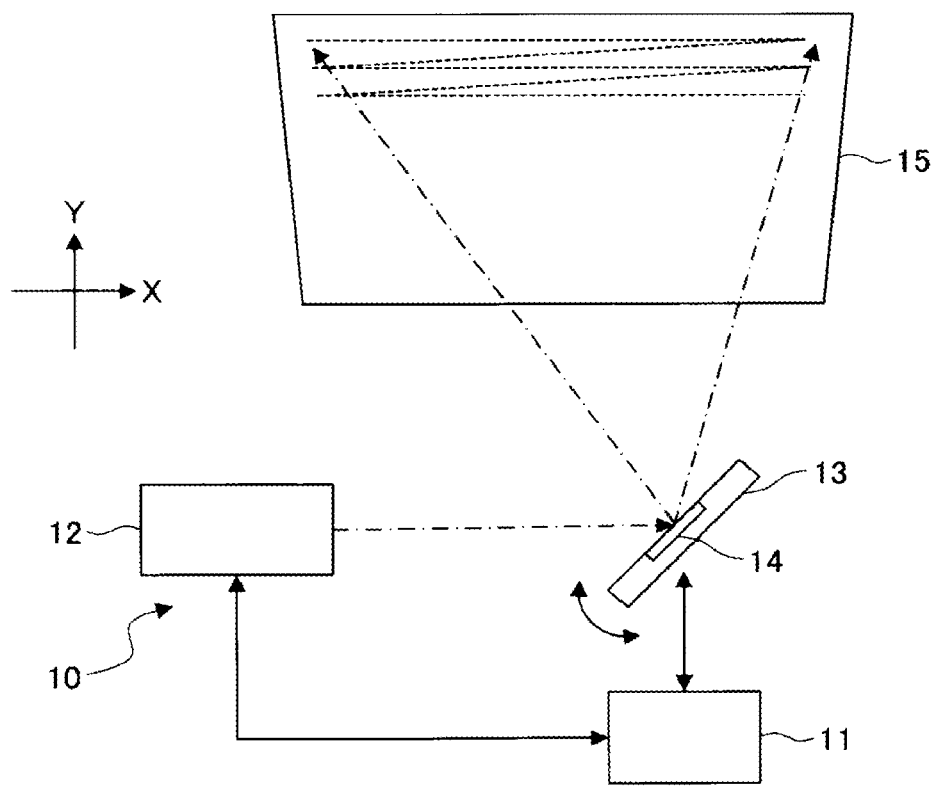
FIG. 1 is a schematic view of an example of an optical scanning system.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide a movable device that achieves an increase in a deflection angle of a movable part provided with a mirror.

The embodiments of the present disclosure are described below in detail. Note that identical components are provided with the same reference numerals and repeated descriptions of the same components are omitted.

With initially reference to FIGS. 1 to 4, an optical scanning system to which a movable device according to an embodiment of the present disclosure is applied is described below in detail.

FIG. 1 is a schematic view of an example of an optical scanning system 10. As illustrated in FIG. 1, the optical scanning system 10 deflects light emitted from a light-source device 12 under the control of a control device 11, by using a reflecting surface 14 included in a movable device 13, so as to optically scan a target surface 15 to be scanned (hereinafter, referred to as target surface).

The optical scanning system 10 includes the control device 11, the light-source device 12, and the movable device 13 including the reflecting surface 14.

The control device 11 is, for example, an electronic circuit unit including, for example, a central processing unit (CPU) and a field-programmable gate array (FPGA). The movable device 13 is, for example, a micro electro mechanical systems (MEMS) device that includes a reflecting surface 14 and that can move the reflecting surface 14. The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions.

The light-source device 12 emits light based on the received drive signal. The movable device 13 moves the reflecting surface 14 in at least one of a uniaxial direction and a biaxial direction, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Figure 2:
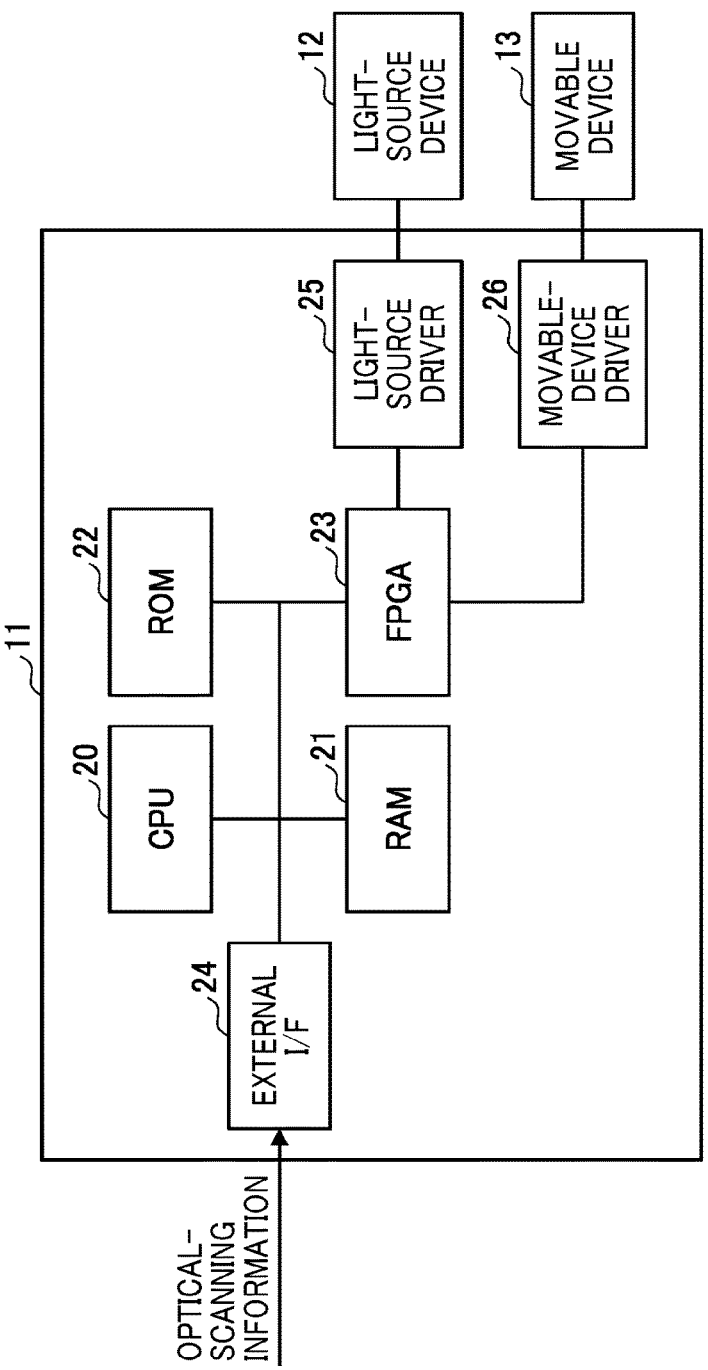
FIG. 2 is a hardware block diagram of the optical scanning system according to an embodiment of the present disclosure.

Next, the hardware configuration of an example of the optical scanning system 10 is described referring to FIG. 2. FIG. 2 is a hardware block diagram of the example of the optical scanning system 10. As illustrated in FIG. 2, the optical scanning system 10 includes the control device 11, the light-source device 12, and the movable device 13, which are electrically connected to one another. The control device 11 includes a CPU 20, a random access memory (RAM) 21, a read only memory (ROM) 22, a FPGA 23, an external interface (I/F) 24, a light-source driver 25, and a movable-device driver 26.

The CPU 20 is an arithmetic device that loads into the RAM 21 a program or data from a storage device such as the ROM 22 and executes processing to provide the controls or functions of the entirety of the control device 11.

The RANI 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). The network may be, for example, a controller area network (CAN) of an automobile, a local area network (LAN), or the Internet. The external I/F 24 may have any configuration that achieves connection to an external device or communication with an external device. The external I/F 24 may be prepared for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. Note that any configuration may be used as long as the CPU 20 can acquire the optical scanning information, and the optical scanning information may be stored in the ROM 22 or in the FPGA 23 in the control device 11, or a storage device such as an SSD may be newly provided in the control device 11 and the optical scanning information may be stored in the storage device.

In this case, the optical-scanning information is information indicating the way of optical scanning to be performed on the target surface 15. For example, the optical-scanning information is image data when an image is displayed by optical scanning. For another example, the optical-scanning information is writing data indicating the order and portion of writing when optical writing is performed by optical scanning. Furthermore, for example, the optical scanning information is irradiation data indicating the timing and range of irradiation of light for object recognition in a case where an object is to be recognized by optical scanning.

The control device 11 can provide the functional configuration described below by using instructions from the CPU 20 and the hardware configuration illustrated in FIG. 2.

Figure 3:
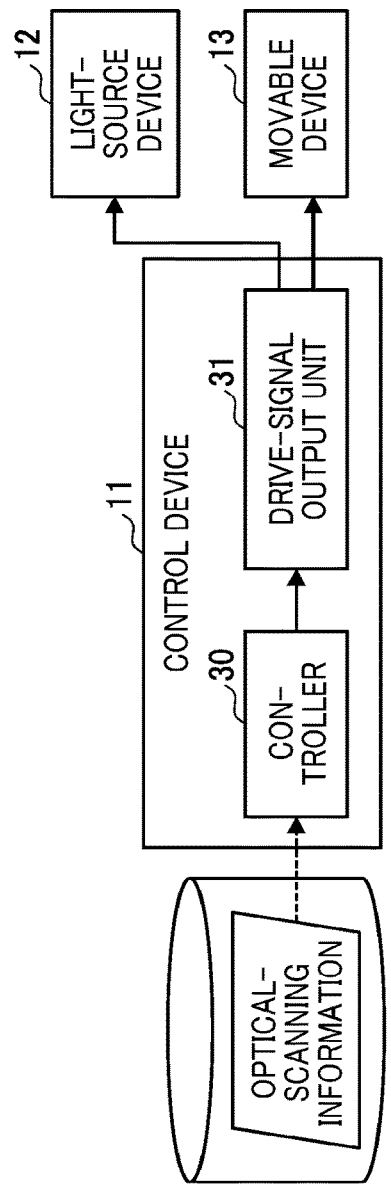
FIG. 3 is a functional block diagram of a control device according to an embodiment of the present disclosure.

Next, the functional configuration of the control device 11 of the optical scanning system 10 is described below referring to FIG. 3. FIG. 3 is a functional block diagram of an example of the control device 11 of the optical scanning system 10.

As illustrated in FIG. 3, the control device 11 has the functions of a controller 30 and a driving-signal output unit 31.

The controller 30 is implemented by, for example, the CPU 20, the FPGA 23, and the like. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 based on the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Figure 4:
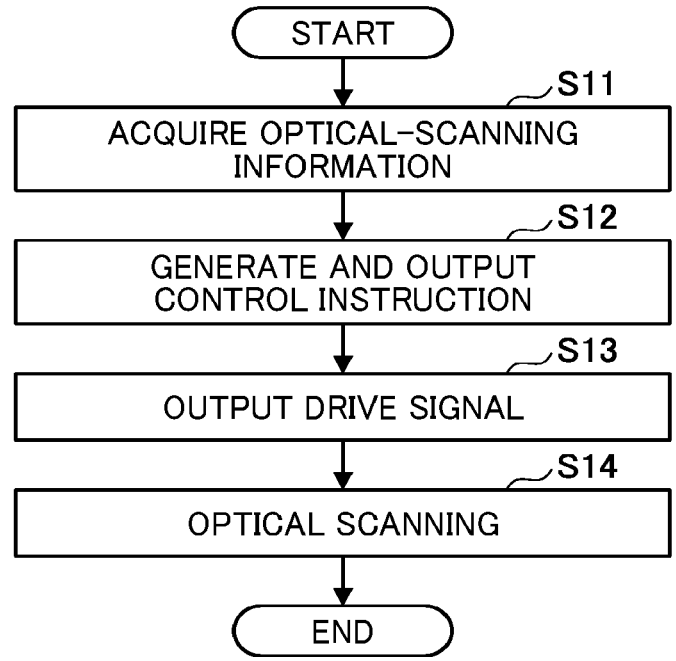
FIG. 4 is a flowchart of an example of processing relating to the optical scanning system.

Next, the process of optically scanning the target surface 15 performed by the optical scanning system 10 is described referring to FIG. 4. FIG. 4 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the movable device 13 provided with the reflecting surface 14, which are elements of the above optical scanning system 10.

Next, an image projection apparatus to which the movable apparatus according to the embodiments of the present disclosure is applied is described with reference to FIGS. 5 and 6.

Figure 5:
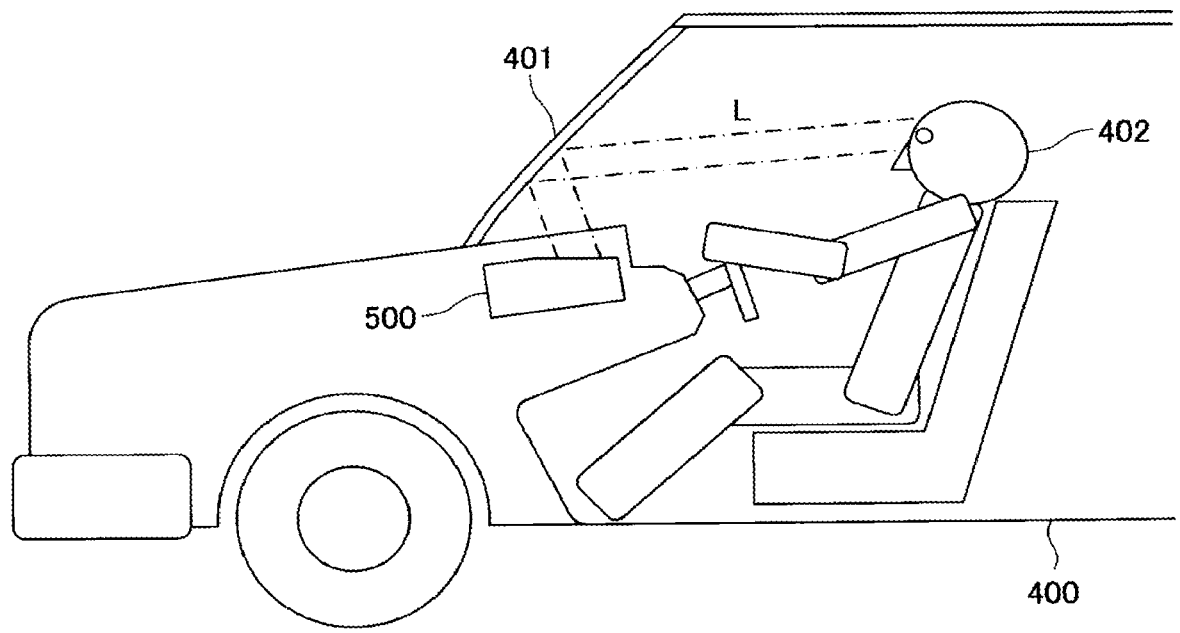
FIG. 5 is a schematic view of a vehicle equipped with a HUD according to an embodiment of the present disclosure.

FIG. 5 is a schematic view of a vehicle 400 equipped with a HUD 500 as an example of an image projection apparatus according to the embodiment. FIG. 6 is a schematic view of the HUD 500 according to an embodiment of the present disclosure.

The image projection apparatus is an apparatus that projects an image by optical scanning, and is, for example, a HUD.

As illustrated in FIG. 5, for example, the HUD 500 is disposed, for example, near a windshield 401 of the vehicle 400 (for example, an automobile). Projection light L that is emitted from the HUD 500 is reflected by the windshield 401 and directed to an observer (a driver 402) as a user. Accordingly, the driver 402 can visually recognize as a virtual image an image or the like projected by the HUD 500. Alternatively, a combiner may be disposed on the inner wall surface of the windshield 401 so that the user can visually recognize a virtual image formed by the projection light that is reflected by the combiner.

Figure 6:
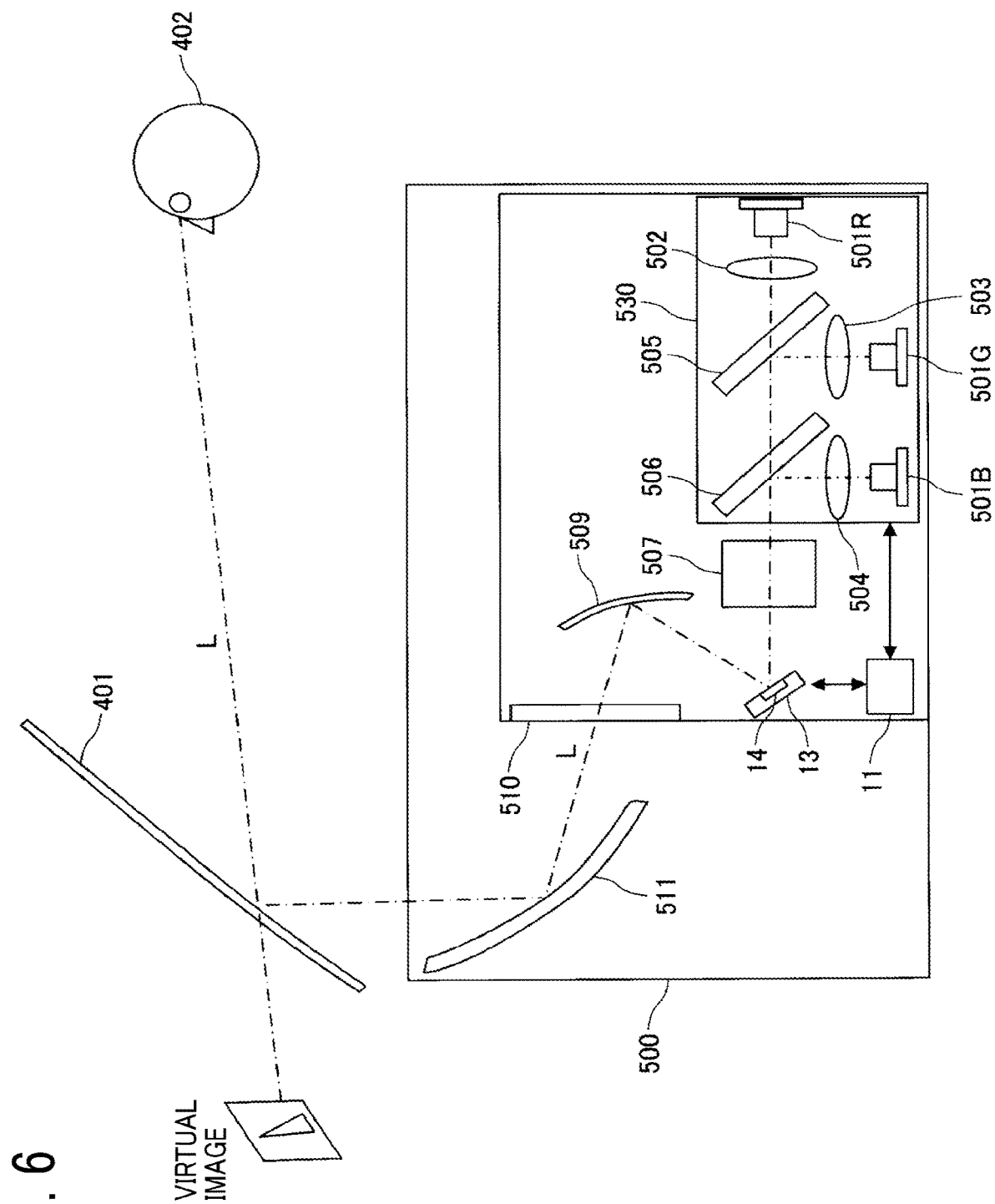
FIG. 6 is a schematic view of an example of the HUD.

As illustrated in FIG. 6, the HUD 500 emits laser beams through red, green, and blue laser beam sources 501R, 501G, and 501B, respectively. The emitted laser beams pass through an incident optical system, and then are deflected by the movable device 13 including the reflecting surface 14. The incident optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are approximately collimated by the collimator lens 502, 503, and 504, and are combined by the two dichroic mirrors 505 and 506 each serving as an optical combiner. The light intensity of the combined laser beams is adjusted by the light-intensity adjuster 507, and then two-dimensional scanning is performed by the movable device 13 provided with the reflecting surface 14. The projection light L used for two-dimensional scanning by the movable device 13 is reflected by the free-form surface mirror 509 so as to correct the distortion, and then is collected and focused onto the intermediate screen 510. Accordingly, an intermediate image is displayed. The intermediate screen 510 is constituted by a microlens array in which a plurality of microlenses are two-dimensionally arranged, and expands the projected light L incident on the intermediate screen 510 in units of microlenses.

The movable device 13 moves the reflecting surface 14 biaxially in a reciprocating manner to perform two-dimensional scanning with the projection light L incident on the reflecting surface 14. The driving of the movable device 13 is controlled in synchronization with the light-emitting timings of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection apparatus may be incorporated in, not only a vehicle or the wearable member, but also, for example, a mobile object such as an aircraft, a ship, or a moving robot, and an immobile object such as an operation robot that operates a driving target such as a manipulator without moving from the installed location.

The HUD 500 is an example of the "head-up display" described in the claims. The vehicle 400 is an example of the "vehicle" recited in the claims.

Next, an optical writing device to which the movable device 13 according to an embodiment of the present disclosure is applied is described in detail with reference to FIGS. 7 and 8.

Figure 7:
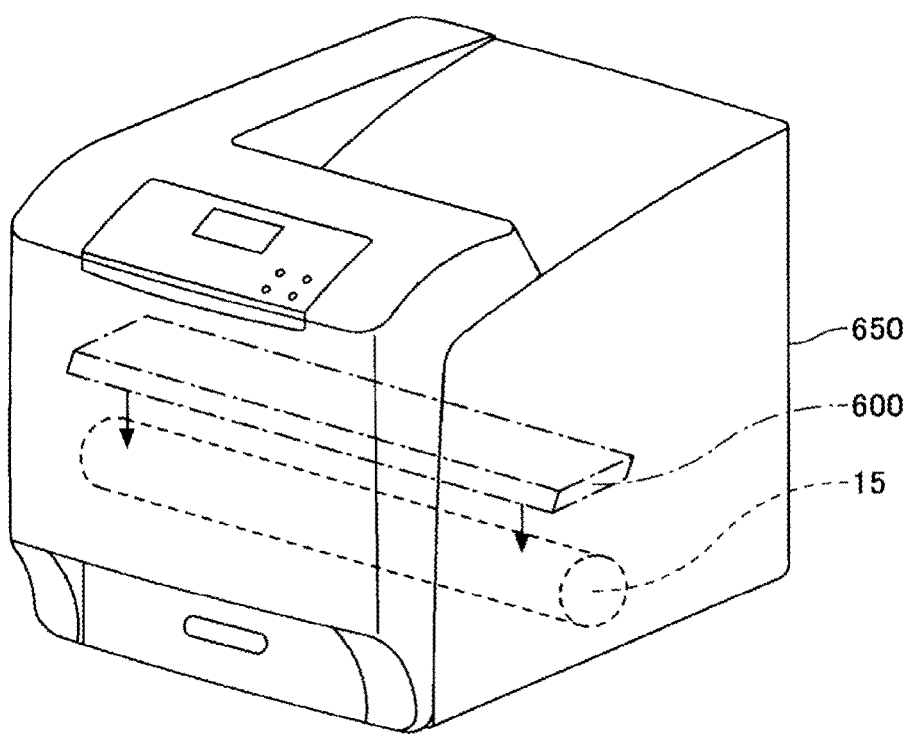
FIG. 7 is a schematic view of an image forming apparatus equipped with an optical writing device, according to an embodiment of the present disclosure.

FIG. 7 is an illustration of an image forming apparatus incorporating an optical writing device 600, according to an embodiment of the present disclosure. FIG. 8 is a schematic view of an example of the optical writing device 600.

As illustrated in FIG. 7, the optical writing device 600 is used as a component of an image forming apparatus typified by, for example, a laser printer 650 having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 8:
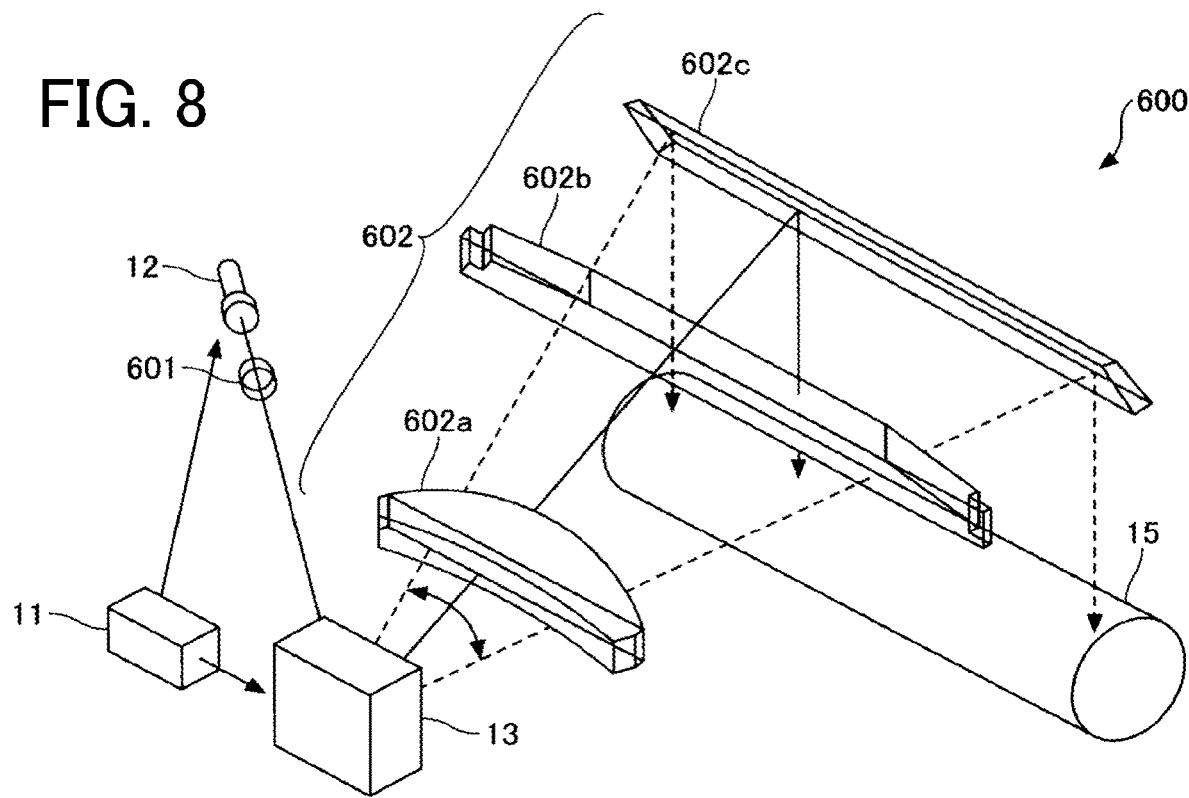
FIG. 8 is a schematic view of the optical writing device according to an embodiment of the present disclosure.

As illustrated in FIG. 8, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are driven based on the control of the control device 11.

As described above, the optical writing device 600 is used as a component of an image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device is advantageous in saving power of the optical writing device because power consumption for driving the movable device 13 is less than that for driving a rotational polygon mirror or the like. The movable device 13 makes a smaller wind noise when the reflector base oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Next, an object recognition device to which the movable device 13 according to an embodiment of the present disclosure is applied is described in detail with reference to FIGS. 9 and 10.

Figure 9:
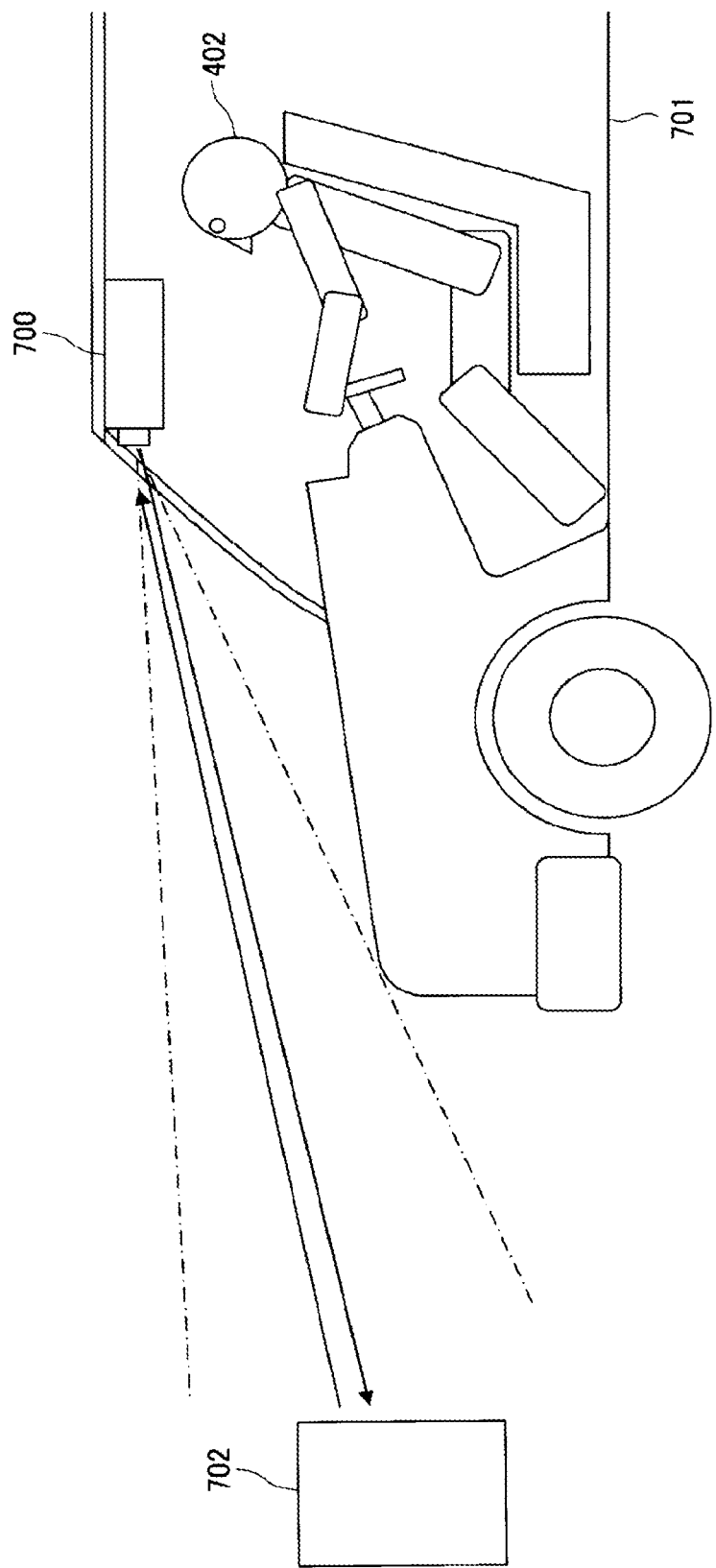
FIG. 9 is a schematic view of a vehicle equipped with a laser imaging detection and ranging (LiDAR) device, according to an embodiment of the present disclosure.

FIG. 9 is a schematic diagram of a vehicle provided with a LiDAR device that serves as an object recognition device according to an embodiment of the present disclosure. FIG. 10 is a schematic view of an example of the LiDAR device.

The object recognition device is an apparatus that recognizes an object in a target direction, and is, for example, a LiDAR device.

As illustrated in FIG. 9, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 10:
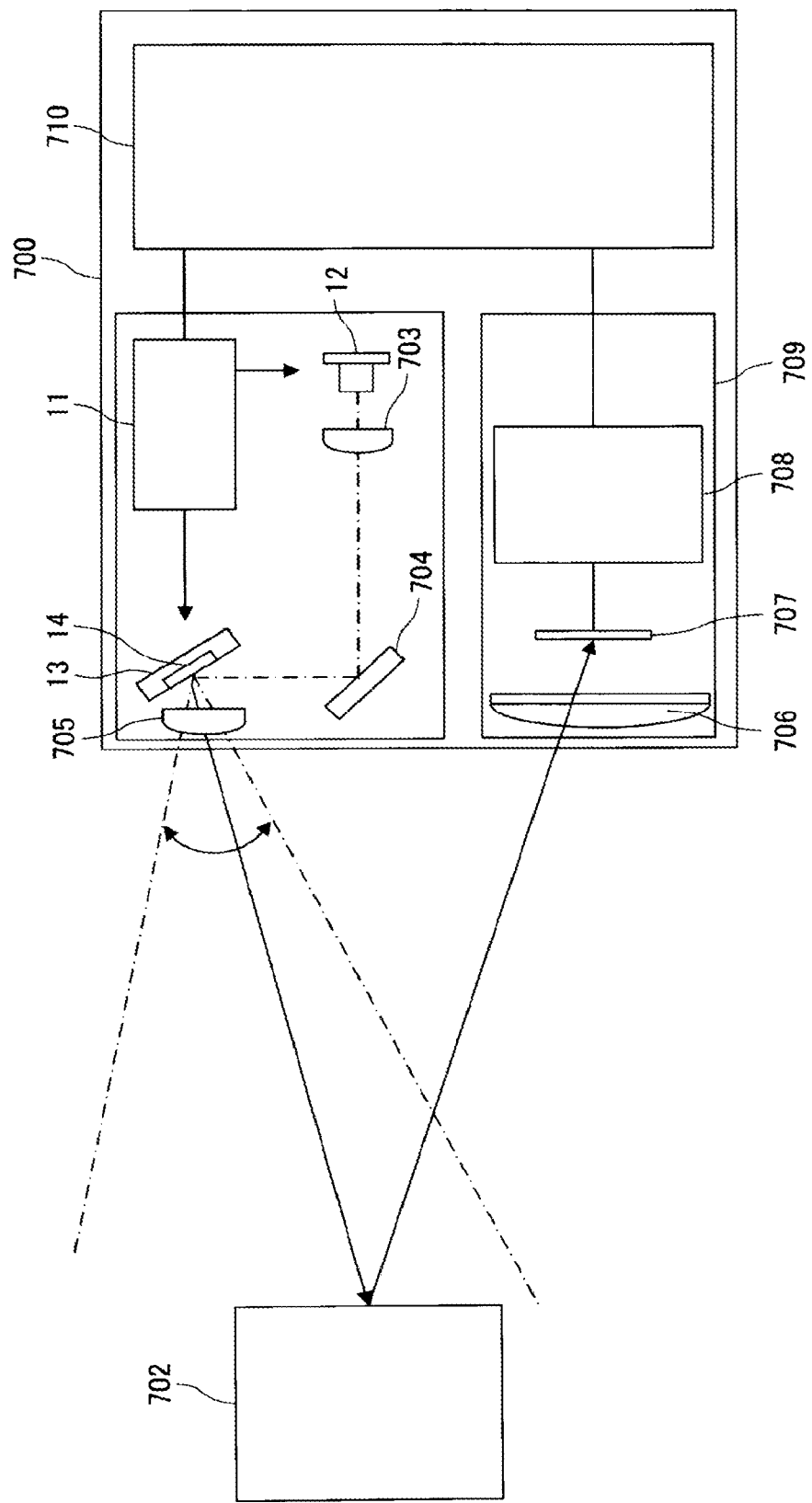
FIG. 10 is a schematic view of the LiDAR device according to an embodiment of the present disclosure.

As illustrated in FIG. 10, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing, such as binarization or noise processing, on the received detected signal, and outputs the results to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to recognize the distance to the obstacle.

In the present embodiment, the LiDAR device 700 is described as an example of the object recognition device. However, no limitation is intended thereby. The object recognition device may be any apparatus that performs optical scanning by controlling the movable device 13 provided with the reflecting surface 14, using the control device 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Figure 11:
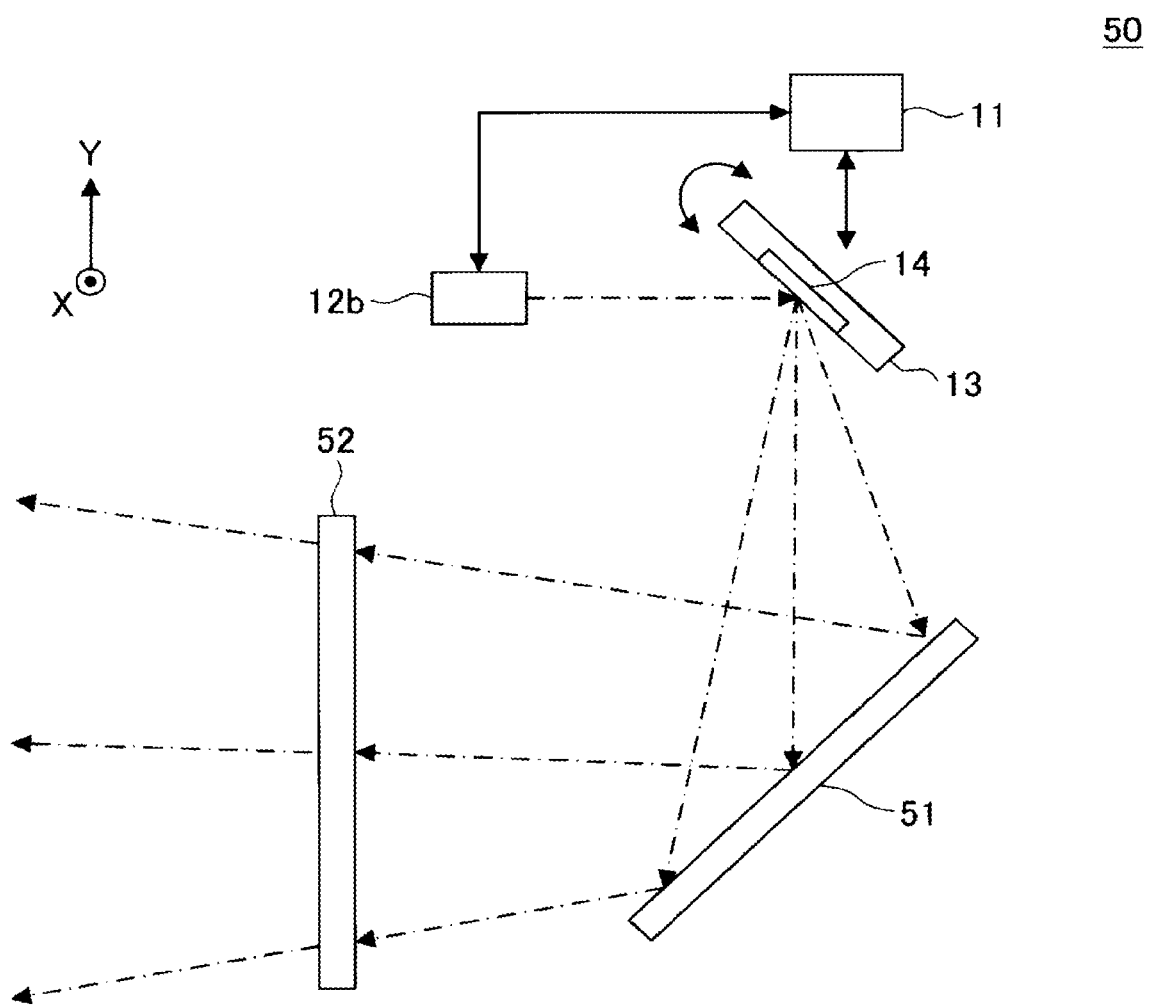
FIG. 11 is a schematic view of an example of a configuration of a laser headlamp.

Next, a laser headlamp 50 in which the movable device of the embodiment is applied to a headlight of a vehicle is described referring to FIG. 11. FIG. 11 is an illustration of the configuration of a laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits a blue laser beam. The laser beam emitted from the light-source device 12b is incident on the movable device 13 and is reflected by the reflecting surface 14. The movable device 13 moves the reflecting surface 14 in the XY-direction based on the signal from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Accordingly, the front of the vehicle is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the automobile.

When the movable device 13 is applied to a headlight of a vehicle, the color of light beams from the light-source device 12b and the color of the phosphor are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Next, an HMD 60 to which the movable device 13 according to an embodiment of the present disclosure is applied is described in detail with reference to FIGS. 12 and 13. Note that the HMD 60 is a head-mounted display that can be mounted on a human head, and can be shaped like, for example, glasses. In the following description, such a head-mounted display may be referred to simply as an HMD.

Figure 12:
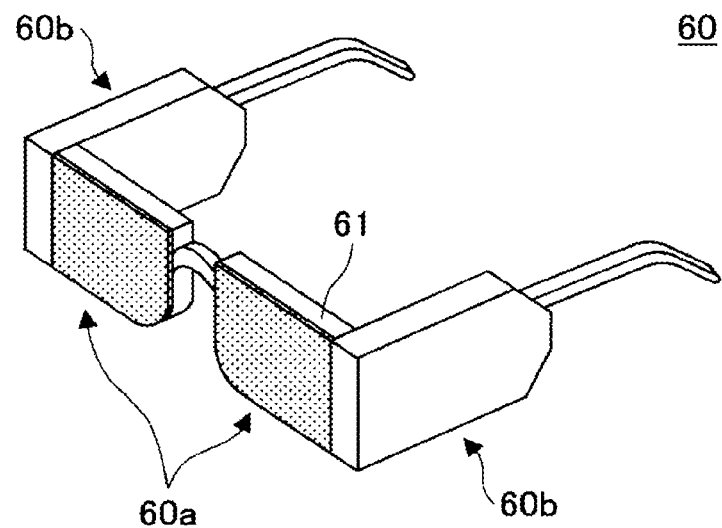
FIG. 12 is a schematic perspective view of an example of a configuration of a head-mounted display (HMD)

FIG. 12 is a perspective view of the appearance of the HMD 60. In FIG. 12, the HMD 60 includes a pair of a front 60a and a temple 60b on each of the left and right, which are approximately symmetrically arranged. The front 60a can include, for example, a light guide plate 61. An optical system, a control device, and the like, can be incorporated in the temple 60b.

Figure 13:
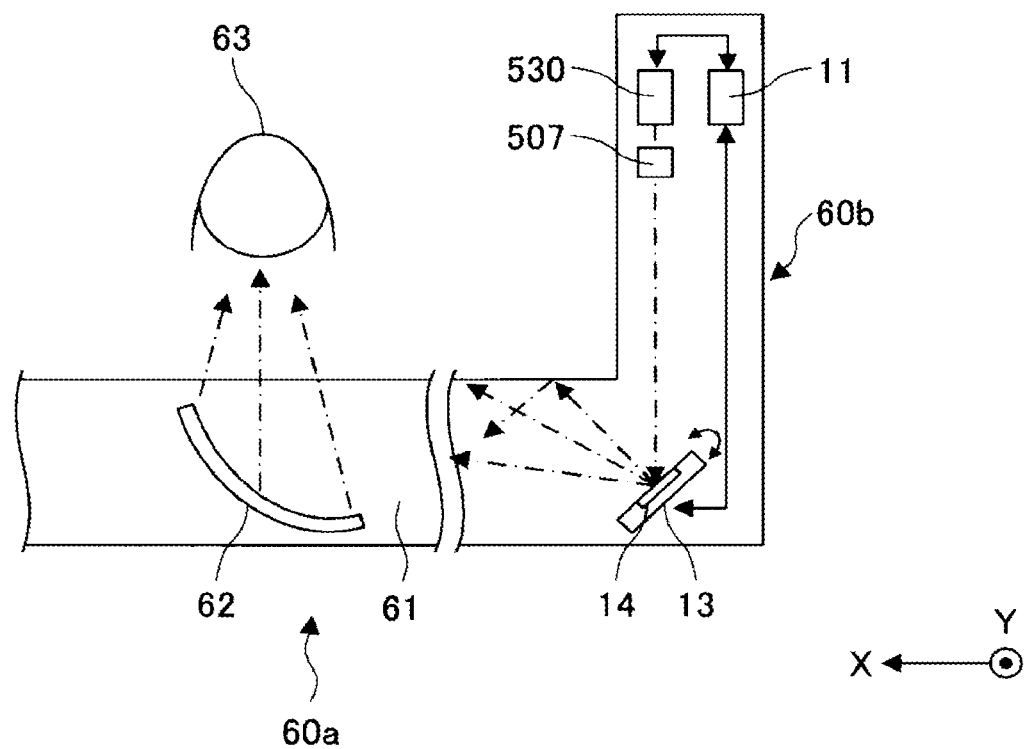
FIG. 13 is an illustration of the configuration of the HMD according to an embodiment of the present disclosure.

FIG. 13 illustrates a partial configuration of the HMD 60. Although the configuration for the left eye is illustrated in FIG. 13, the HMD 60 has a configuration similar to that for the right eye.

The HMD 60 includes a control device 11, a light source unit 530, a light-intensity adjuster 507, a movable device 13 including a reflecting surface 14, a light guide plate 61, and a half mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506 each as serving as an optical combiner. The combined parallel light is emitted from the light source unit 530.

The light intensity of the combined laser beams from the light source unit 530 is adjusted by the light-intensity adjuster 507, and then the light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall, and guides the scanning light to the half mirror 62. The light guide plate 61 is formed by, for example, resin that has transparency to the wavelength of the scanning light.

The half mirror 62 reflects the light from the light guide plate 61 to the back side of the HMD 60, and the reflected light travels toward the eyes of a wearer 63 of the HMD 60.

The half mirror 62 has, for example, a free-form surface shape. The image of the scanning light is reflected by the half mirror 62, and then is formed on the retina of the wearer 63. The image of the scanning light is formed on the retina of the wearer 63 due to the reflection at the half mirror 62 and the effect of the crystalline lenses of eyeballs. Moreover, due to the reflection at the half mirror 62, the spatial distortion of the image is corrected. The wearer 63 can observe an image formed by the light of scanning in the XY direction.

The wearer 63 observes an image of external light superposed on the image of the scanning light because of the half mirror 62. The half mirror 62 may be replaced with a mirror to exclude the extraneous light. In such a configuration, only the image that is formed by scanning light can be observed.

Next, the packaging of the movable device 13 according to an embodiment of the present disclosure is described with reference to FIG. 14.

Figure 14:
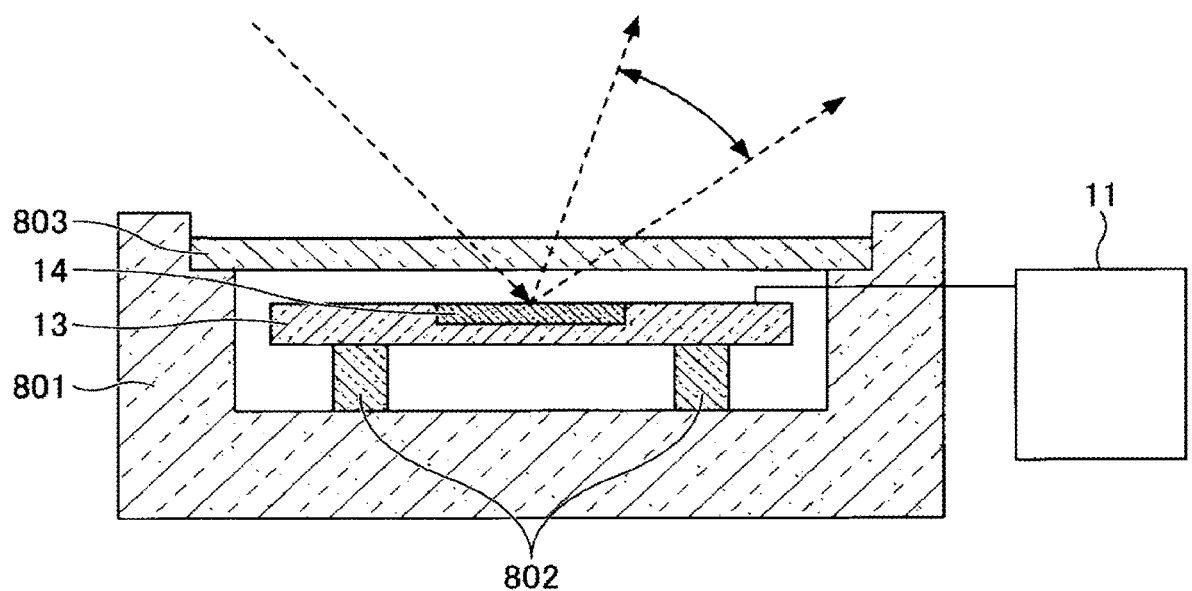
FIG. 14 is a schematic view of a packaged movable device.

FIG. 14 is a schematic view of an example of a packaged movable device 13.

As illustrated in FIG. 14, the movable device 13 is mounted on a mounting member 802 inside a package member 801. The package member 801 is partly covered with and sealed by a transmissive member 803 so that the movable device 13 is packaged. The package contains inert gas such as nitrogen and is sealed. This configuration can substantially prevent the deterioration of the movable device 13 due to oxidation, and increase the durability against changes in environment such as temperature.

The following describes details of the movable device of the embodiments of the present disclosure used for the light deflection system, the light scanning system, the image projection apparatus, the optical writing device, the object recognition device, the laser headlamp and the HMD described above with reference to the drawings. Like reference signs are applied to identical or corresponding components throughout the drawings and redundant description thereof may be omitted.

In the description of the, a main scanning is an optical scanning with a second axis as the center of rotation, and a sub-scanning is an optical scanning with a first axis as the center of rotation. In the description of the embodiments of the present disclosure, terms such as rotation, oscillation, and movement are synonymous. In the drawings, the X-direction is parallel to the first axis, and the Y-axis is parallel to the second axis. The Z-direction is perpendicular to the XY plane. The Z-direction is an example of a direction in which layers are stacked, that is, a stacking direction.

A light deflector as a movable device according to a first embodiment is described below. The light deflector (movable device 13) as illustrated in FIG. 15 includes a movable part 110, a mirror unit 111 provided on the movable part 110, a torsion bar 112, a first cantilever part 113 having no piezoelectric element, and a second cantilever part 114 having a piezoelectric element, and a stationary part 115.

More specifically, the torsion bar 112 is coupled to each side of the movable part 110 in the −X direction and the +X direction. Each torsion bar 112 has a shape elongated in the X direction and extends from the movable part 110. Further, one end of the torsion bar 112 is coupled to the movable part 110, and the other end of the torsion bar 112 is coupled to the first cantilever part 113. The first cantilever part 113 has a shape elongated in the Y direction to cause the torsion bar 112 to torsionally vibrate. The other end of the torsion bar 112 is coupled to the center of the first cantilever part 113. One end of the second cantilever part 114 is coupled to each end of the first cantilever part 113 at the opposite side of the torsion bar 112 side. The other end of the second cantilever part 114 is coupled to the frame-shaped stationary part 115. Examples of the shape of the stationary part 115 may include a rectangular shape and a shape in which a light passing area for allowing light reflected by the mirror unit 111 to pass therethrough is provided along the Y direction. The light passing area may be space or may include a member that transmits light, such as glass. The shape provided with the light passing area enables light reflected by the mirror unit 111 to be less likely to be blocked by the stationary part 115 when the deflection angle of the movable part 110 is increased.

Figure 15:
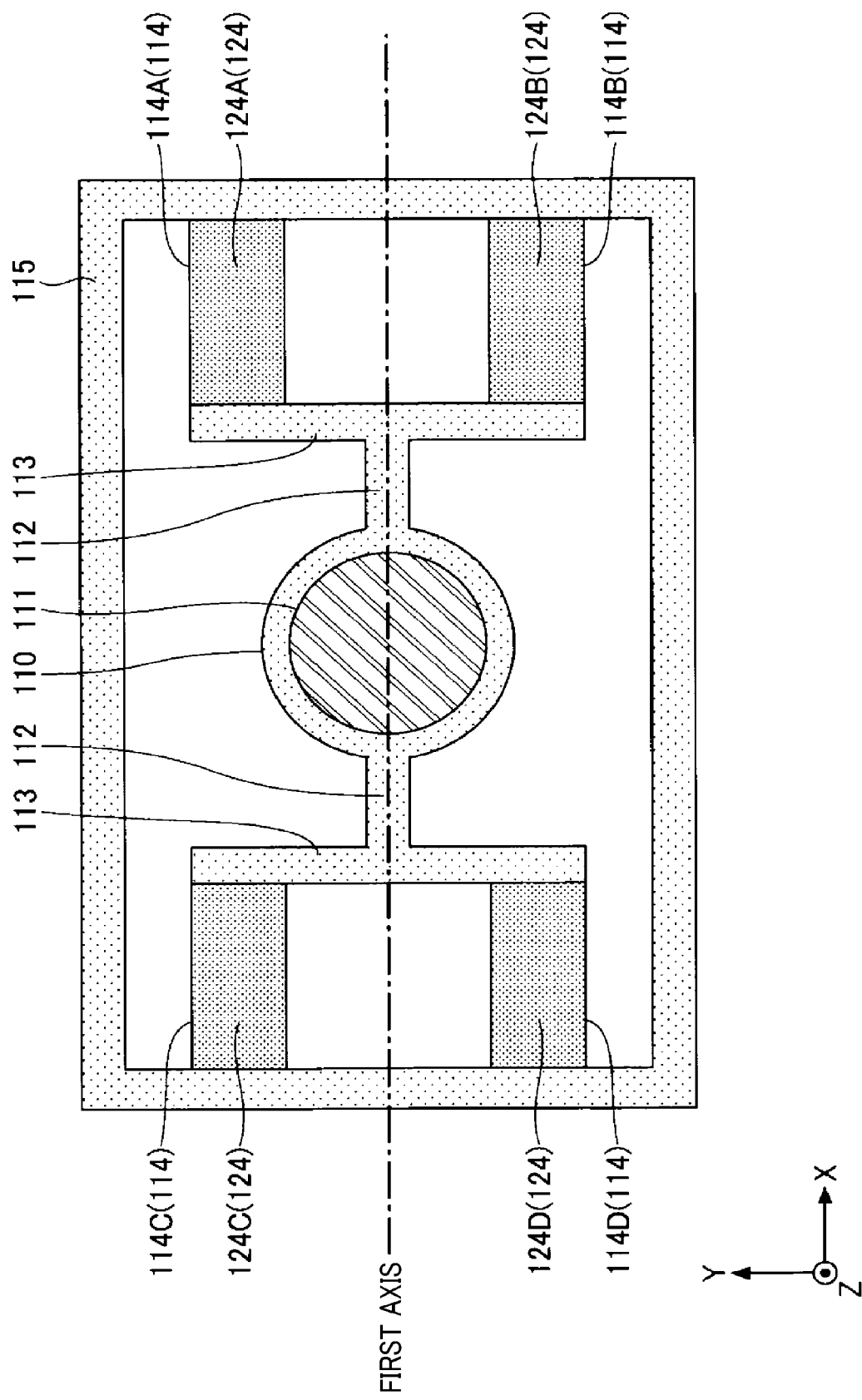
FIG. 15 is a diagram of a configuration of a light deflector as a movable device according to an embodiment.

In short, the light deflector in FIG. 15 includes the torsion bars 112, the first cantilever parts 113, and the second cantilever parts 114. Each torsion bar 112 is coupled to a corresponding one of the first cantilever parts 113 such that the longitudinal direction of the torsion bar 112 is orthogonal to the longitudinal direction of the corresponding first cantilever part 113. Further, each second cantilever part 114 is coupled to a corresponding one of the first cantilever parts 113 such that the longitudinal direction of the second cantilever part 114 is orthogonal to the longitudinal direction of the corresponding first cantilever part 113. Accordingly, the longitudinal direction of the torsion bars 112 is parallel to the longitudinal direction of the second cantilever parts 114. In the light deflector in FIG. 15, each of four second cantilever parts 114 (114A, 114B, 114C, 114D) has the same shape.

A piezoelectric element 124 is provided on the surface of each second cantilever part 114. Using the inverse piezoelectric effect of the piezoelectric element 124, each second cantilever part 114 is deformed, and vibration due to the deformation of the second cantilever parts 114 is transmitted to the first cantilever parts 113. Thus, the first cantilever parts 113 are caused to oscillate. The oscillation of each first cantilever part 113 swing of the first cantilever part 113 causes the corresponding torsion bar 112 to be twisted, and the twist of the torsion bars 112 generates vibration that rotates the movable part 110 about the first axis.

When a voltage is applied in the Z direction to the piezoelectric element 124 on the surface of the second cantilever part 114, the piezoelectric element 124 contracts in the in-plane direction, and accordingly, the movable part 110 side end of the second cantilever part 114 in the X direction, i.e., the longitudinal direction, is deformed in the +Z direction in FIG. 15. In the present disclosure, the piezoelectric element is also referred to as a driver.

The light deflector in FIG. 15 includes four second cantilever parts 114. More specifically, a second cantilever part 114A is arranged at the upper right, a second cantilever part 114B is arranged at the lower right, a second cantilever part 114C is arranged at the upper left, and ae second cantilever part 114D is arranged at the lower left of the light deflector in FIG. 15. The second cantilever part 114A is provided with a piezoelectric element 124A, the second cantilever part 114B is provided with a piezoelectric element 124B, the second cantilever part 114C is provided with a piezoelectric element 124C, and the second cantilever part 114D is provided with a piezoelectric element 124D.

When the light deflector in FIG. 15 is resonantly driven, for example, a sinusoidal voltage is applied to the piezoelectric elements 124 on the surfaces of the second cantilever parts 114. In this case, the piezoelectric element 124A and the piezoelectric element 124C have the same phase, and the piezoelectric element 124B and the piezoelectric element 124D have the same phase. The phases of the piezoelectric elements 124B and 124D are shifted by 180° with respect to the phases of the piezoelectric elements 124A and 124C.

As a result, the first cantilever part 113 vibrates so as to oscillate about the first axis, and this vibration causes the torsion bar 112 coupled to the center of the first cantilever part 113 to torsionally move. The torsional movement of the torsion bar 112 causes the movable part 110 to oscillate. In the case of driving other than the resonance driving, the applied voltage is not limited to the sine wave, and may be a triangular wave, a sawtooth wave, a rectangular wave, or the like.

Figure 16:
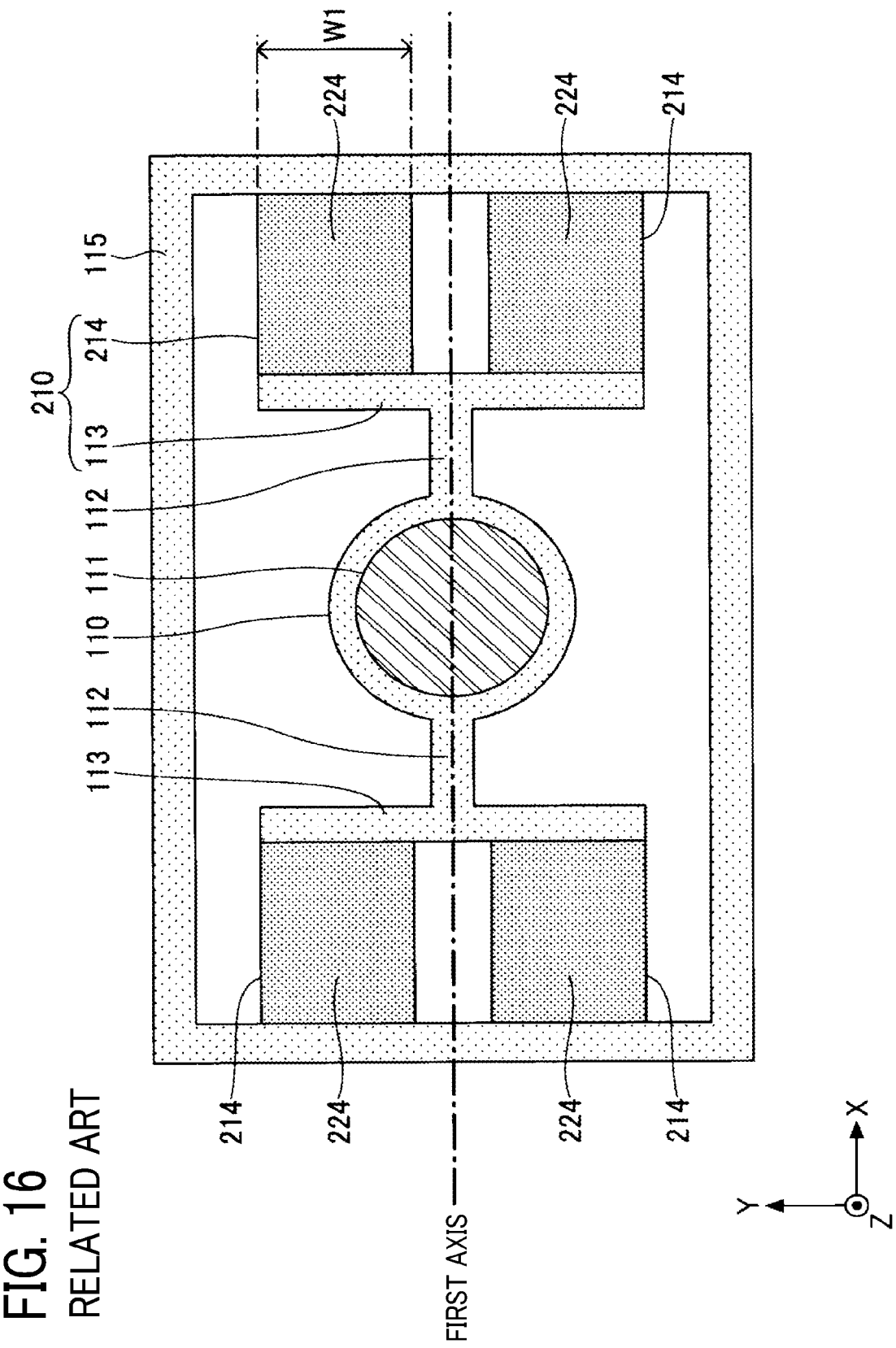
FIG. 16 is a diagram of a configuration of a light deflector as a movable device according to a comparative example.

There is demand for a movable part 110 of the light deflector to have as large a deflection angle as possible. The area of a piezoelectric element on the surface of the second cantilever part could be increased to increase the deflection angle of the movable part 110 per unit voltage applied. Specifically, as illustrated in FIG. 16, the width of each second cantilever part 214 in the Y direction is approximately doubled with respect to the width of the second cantilever part 114 in FIG. 15. As a result, the area of the piezoelectric element 224 on the surface of the second cantilever part 214 can be approximately doubled. The first cantilever part 113 having a piezoelectric element and the second cantilever parts 214 each having no piezoelectric element constitute a cantilever 210.

In the light deflector as illustrated in FIG. 16, however, the width W1 of a coupling portion between the first cantilever part 113 and the second cantilever part 214 increases, and the cross-sectional area of the coupling portion also increases, which thus increases the bending elastic modulus. As a result, the deformation of the first cantilever part 113 is restricted by the second cantilever part 214, which hampers an increase in the deflection angle of the movable part 110.

In other words, the piezoelectric element 124 is provided on the surface of the second cantilever part 114. In typical light deflectors incorporating a piezoelectric element, increasing the area of the piezoelectric element enables an increase in the deflection angle of the movable part 110 of the light deflector. However, if the area of the piezoelectric element is increased as illustrated in FIG. 16 so as to increase the deflection angle of the movable part 110 of the light deflector, the width of the second cantilever part 114 is also increased, and the width of the coupling portion at which the first cantilever part 113 is coupled with the second cantilever part 114 is increased. The increase in the width of the coupling portion adversely increases the bending elastic modulus, and the movement of the movable part 110 is restricted, thus preventing an increase in the deflection angle of the movable part 110.

Hence, the light deflectors are still desired to have a configuration that achieves an increase in the deflection angle of the movable part 110.

A light deflector as a movable device according to a first embodiment is described below. In the light deflector according to the present embodiment, the width of a second cantilever part is increased and the width of the coupling portion of a first cantilever part and the second cantilever part is reduced so as to prevent an increase in bending elastic modulus.

Figure 17:
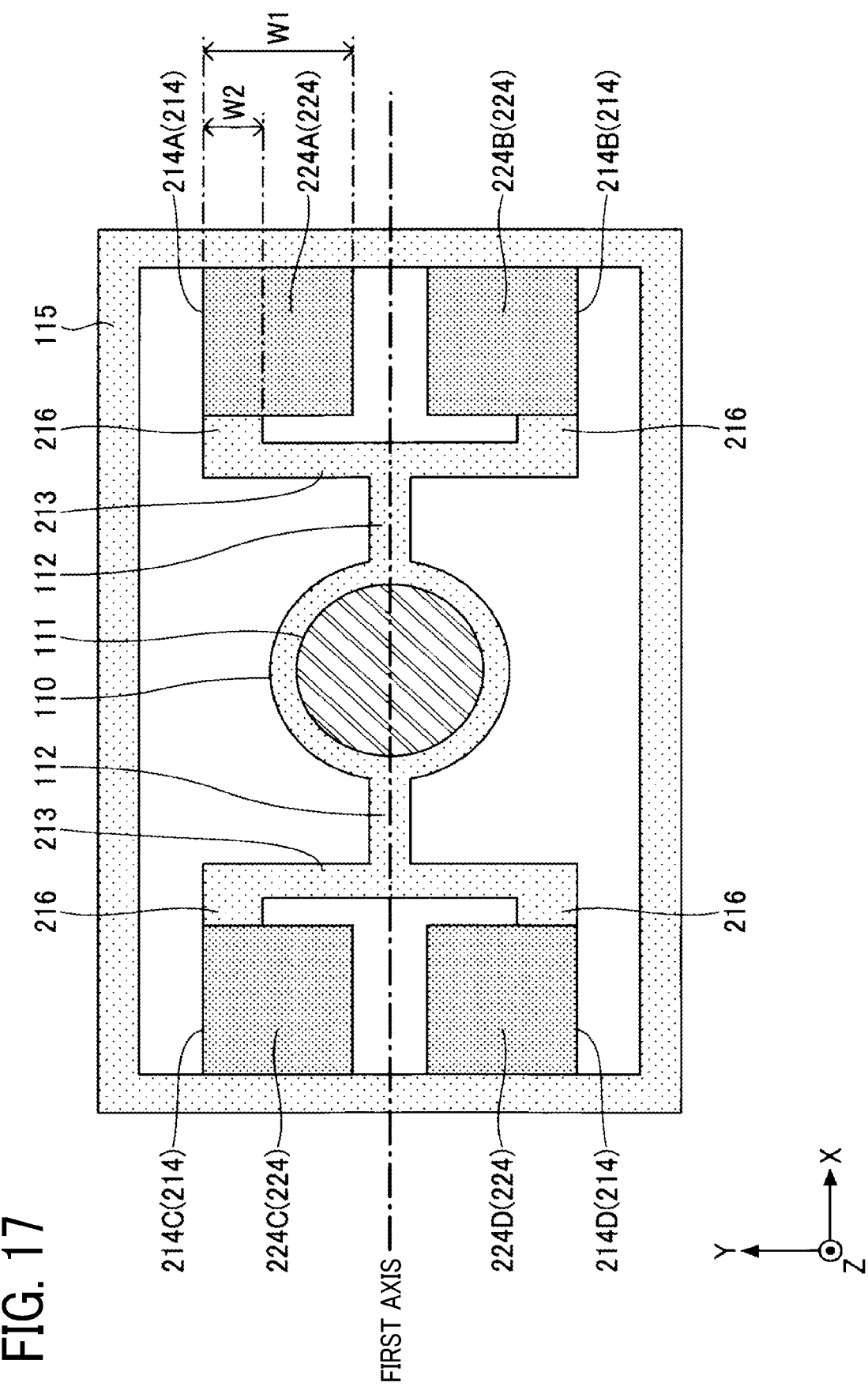
FIG. 17 is a diagram of a configuration of a light deflector as a movable device according to a first embodiment.

In the light deflector according to the present embodiment as illustrated in FIG. 17, the width W2 of a coupling portion 216 coupling the first cantilever part 213 with the second cantilever part 214 is narrower than the width W1 of the second cantilever part 214 in the Y direction. In other words, W1 is greater than W2 (W1>W2). This configuration enables the cross-sectional area of the coupling portion 216 coupling the first cantilever part 213 with the second cantilever part 214 to reduced, which further enables a reduction in bending elastic modulus. As a result, the deformation of the first cantilever part 213 is prevented from being restricted by the second cantilever part 214, which thereby achieves an increase in the deflection angle of the movable part 110.

The width W1 of the second cantilever part 214 and the width W2 of the coupling portion 216 coupling the first cantilever part 213 with the second cantilever part 214 are widths in the Y direction. In other words, the width W1 is along the same direction as that of the width of the coupling portion 216.

In short, the light deflector according to the present embodiment, the width W1 of the second cantilever part 214 in the Y direction is made wider so as to increase the area of the piezoelectric element 224 on the second cantilever part 214. Further, the width W2 of the coupling portion coupling the first cantilever part 213 with the second cantilever part 214 is made narrower so as to reduce the bending elastic modulus of the coupling portion 216.

This configuration of the light deflector according to the present embodiment as illustrated in FIG. 17 achieves an increase in the deflection angle of the movable part 110 by 10% to 20% as compared with the light deflector in FIG. 15 when the same degree of voltage is applied to the piezoelectric element on the surface of the second cantilever part.

In the light deflector according to the present embodiment, a second cantilever part 214A is arranged at the upper right, a second cantilever part 214B is arranged at the lower right, a second cantilever part 214C is arranged at the upper left, and ae second cantilever part 214D is arranged at the lower left of the light deflector in FIG. 17. The second cantilever part 214A is provided with a piezoelectric element 224A, the second cantilever part 214B is provided with a piezoelectric element 224B, the second cantilever part 214C is provided with a piezoelectric element 224C, and the second cantilever part 214D is provided with a piezoelectric element 224D. The method of driving the piezoelectric element is similar to that illustrated in FIG. 15.

Figure 18:
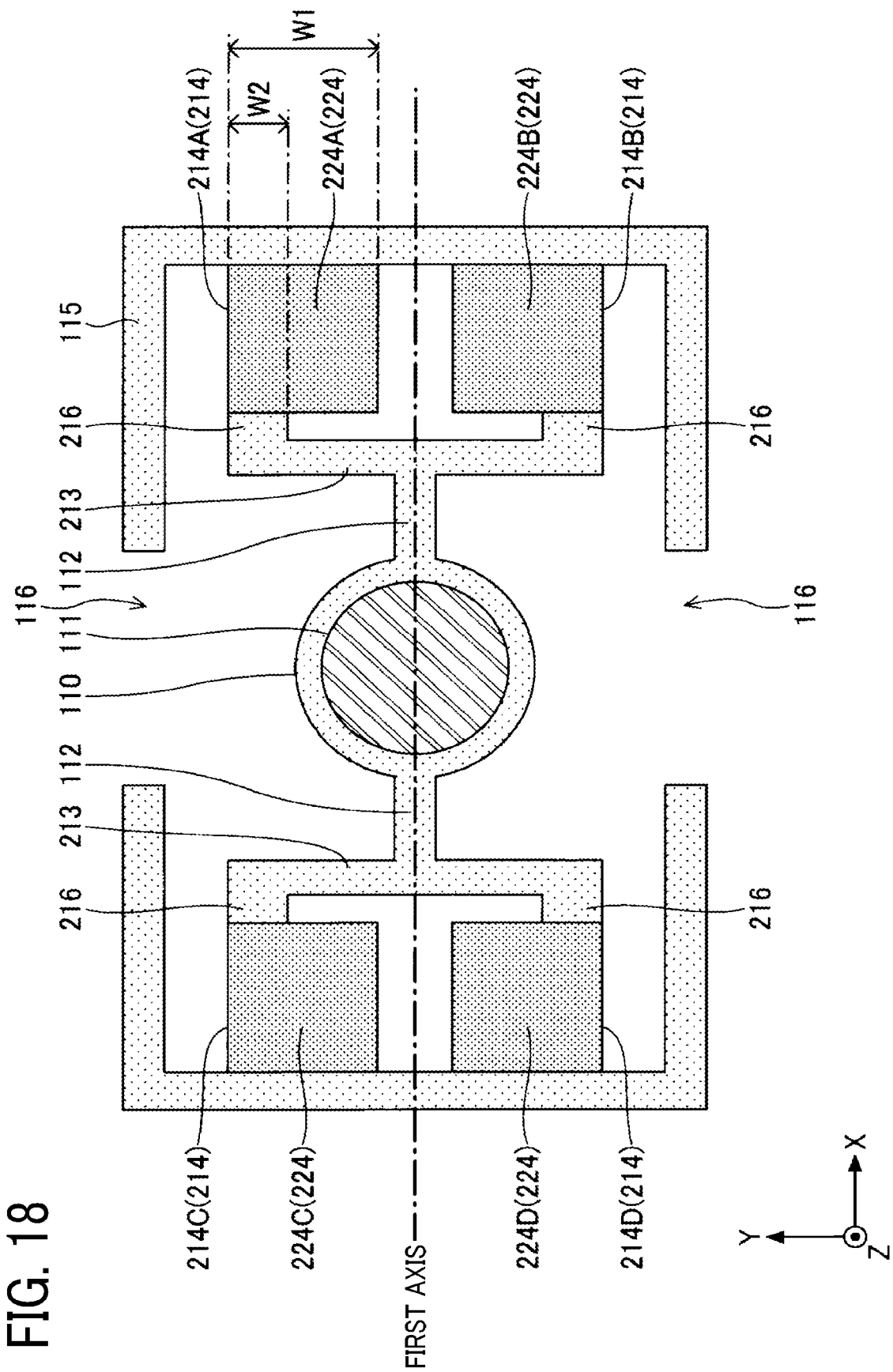
FIG. 18 is a diagram of a configuration of a light deflector as a movable device according to a modification of the first embodiment.

In some examples of the light deflector, the stationary part 115 may be provided with a light passing area 116 at the −Y side and the +Y side of the movable part 110 as illustrated in FIG. 18. The light passing area 116 allows light reflected by the mirror unit 111 on the movable part 110 to pass therethrough. The light passing area 116 is a space obtained by removing a part of the stationary part 115 and enables light to be less likely to be blocked by the stationary part 115 when the deflection angle of the movable part 110 is increased.

Next, a light deflector as a movable device according to a second embodiment is described. In the light deflector according to the present embodiment, the position of the coupling portion 216 at which the first cantilever part 213 is coupled to the second cantilever part 214 is different from the first embodiment.

When a voltage is applied to the piezoelectric element 224 on the surface of the second cantilever part 214, the second cantilever part 214 is deformed in a wavy manner in the width direction, i.e., the Y direction. The light deflector as illustrated in FIG. 17 might fail to effectively transfer the deformation of the second cantilever part 214 to the first cantilever part 213 because the tip portion of the second cantilever part 214, to which the coupling portion 216 is coupled, has a component that causes a deformation in another direction other than the Z direction.

In the light deflector according to the present embodiment, the coupling portion 216 of the first cantilever part 213 is coupled to the second cantilever part 214 at a position closer to the first axis, so as to deal with such an issue. This configuration prevents the possibility of causing the coupling portion 216 of the first cantilever part 213, to which the second cantilever part 214 is coupled, to deform in another direction other than the Z direction. Thus, the vibration of the second cantilever part 214 is transmitted to the first cantilever part 213 more effectively. As a result, an increase in the deflection angle of the movable part 110 is achieved. In other words, the amount of torsion by the first cantilever part 213 can be increased.

Figure 20:
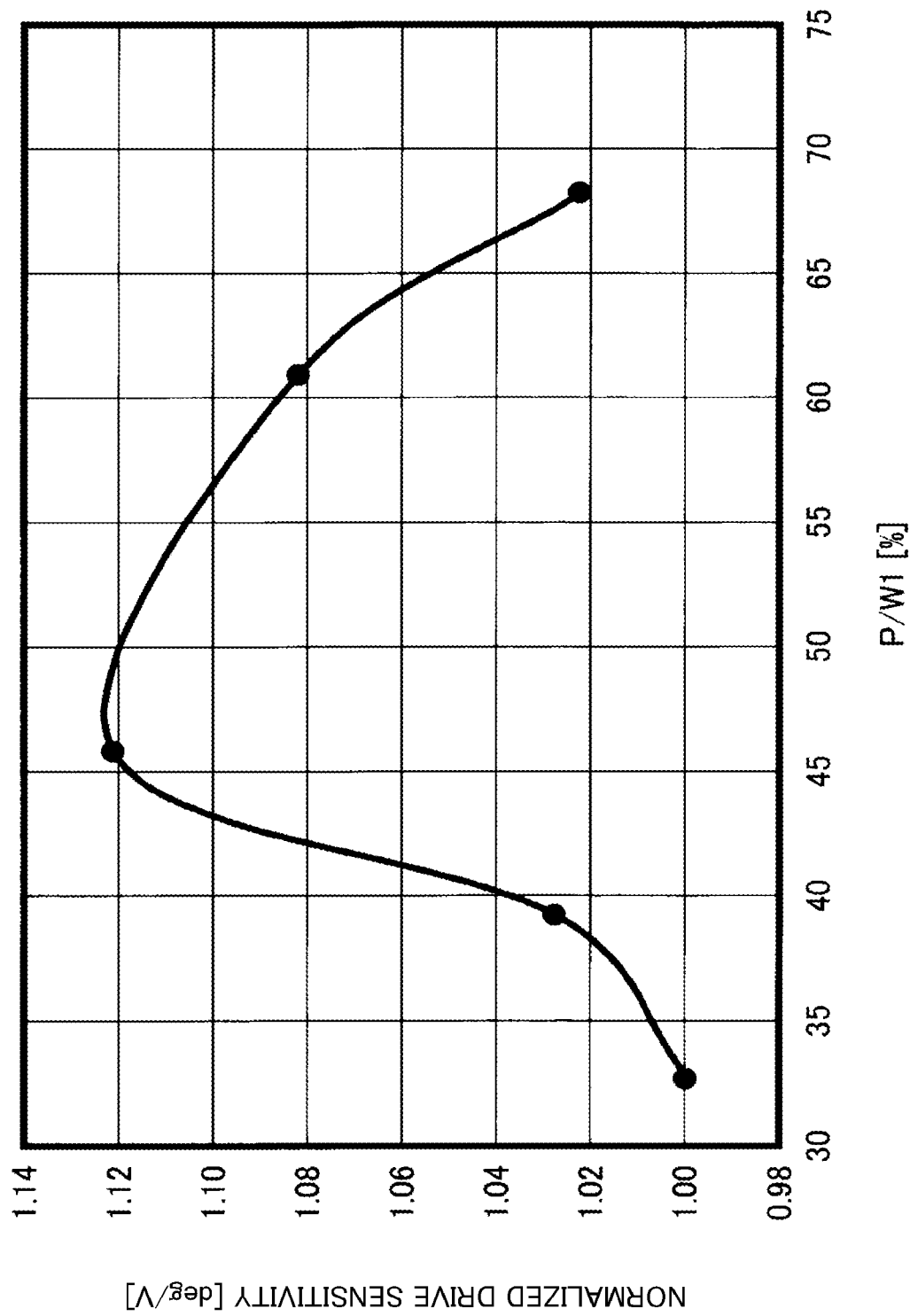
FIG. 20 is a graph indicating the characteristics of the light deflector as the movable device according to the second embodiment.

FIG. 20 is a graph indicating simulation results by a finite element method, with respect to the relation of the drive sensitivity and the position at which the coupling portion 216 of the first cantilever part 213 is coupled with the second cantilever part 214. The drive sensitivity indicated in FIG. 20 is normalized.

Figure 21:
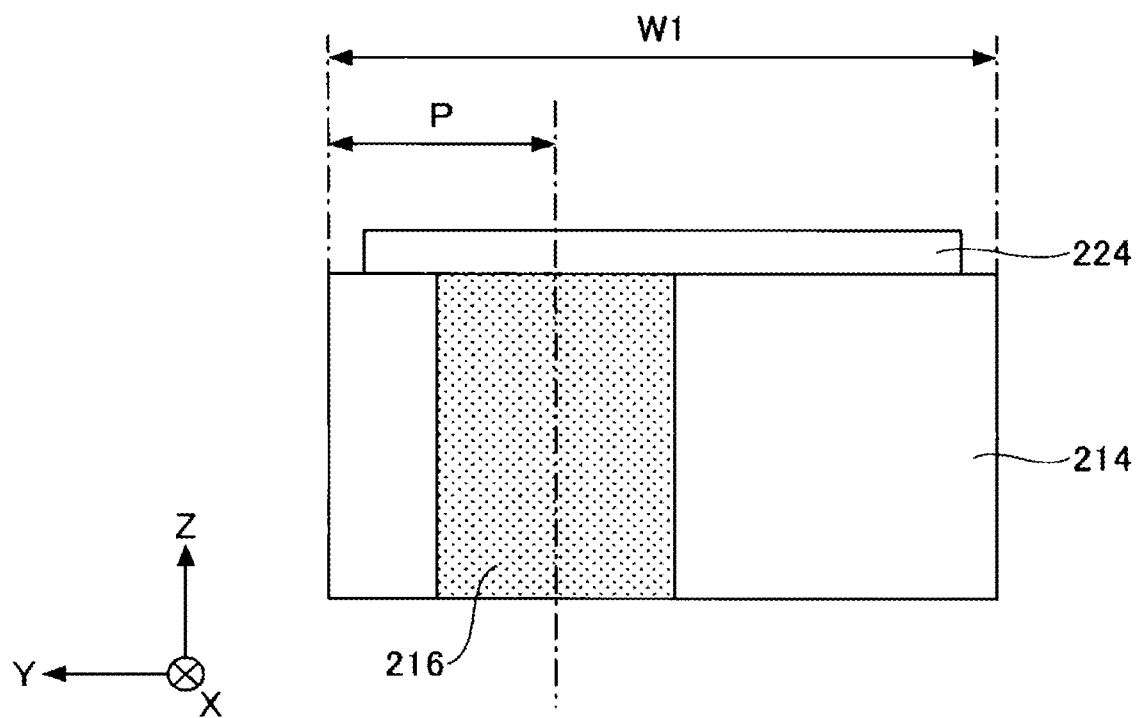
FIG. 21 is an illustration of the light deflector as the movable device according to the second embodiment.

FIG. 21 is an illustration of the position at which the coupling portion 216 of the first cantilever part 213 is coupled to the second cantilever part 214. FIG. 21 is also a cross-sectional view taken along a dot-and-dash line 19A-19B in FIG. 19 as viewed from the direction indicated by broken line arrow. In FIG. 21, W1 denotes the width of the second cantilever part 214 in the width direction, i.e., the Y direction. Further, P denotes a distance between the outer edge of the second cantilever part 214 in the width direction, that is, +Y-side edge of the second cantilever part 214, and the center of the coupling portion 216.

The horizontal axis of FIG. 20 indicates values of the ratio of P to W1 (P/W1). The value of W1 is constant, and the value of P/W1 is variable with a change in P. When P/W1 is 50%, for example, the center of the second cantilever part 214 in the width direction is positioned at the center of the coupling portion 216. In other words, the center of the second cantilever part 214 in the Y direction is positioned at the center of the coupling portion 216 in the Y direction. In FIG. 20, the normalized drive sensitivity is 1 deg/V when P/W1 is 32.5%.

As P/W1 increases, the normalized drive sensitivity increases at first. When P/W1 is 45% to 50%, the normalized drive sensitivity reaches a peak of 1.12. Then, the normalized drive sensitivity gradually decreases when P/W1 is 50% or more and continues increasing.

In the present embodiment, P/W1 is preferably more than or equal to 42% and less than or equal to 57% so as to obtain a normalized drive sensitivity of 1.1 deg/V or more. More preferably, P/W1 is more than or equal to 45% and less than or equal to 50% so as to obtain a normalized drive sensitivity of 12 deg/V or more.

Figure 19:
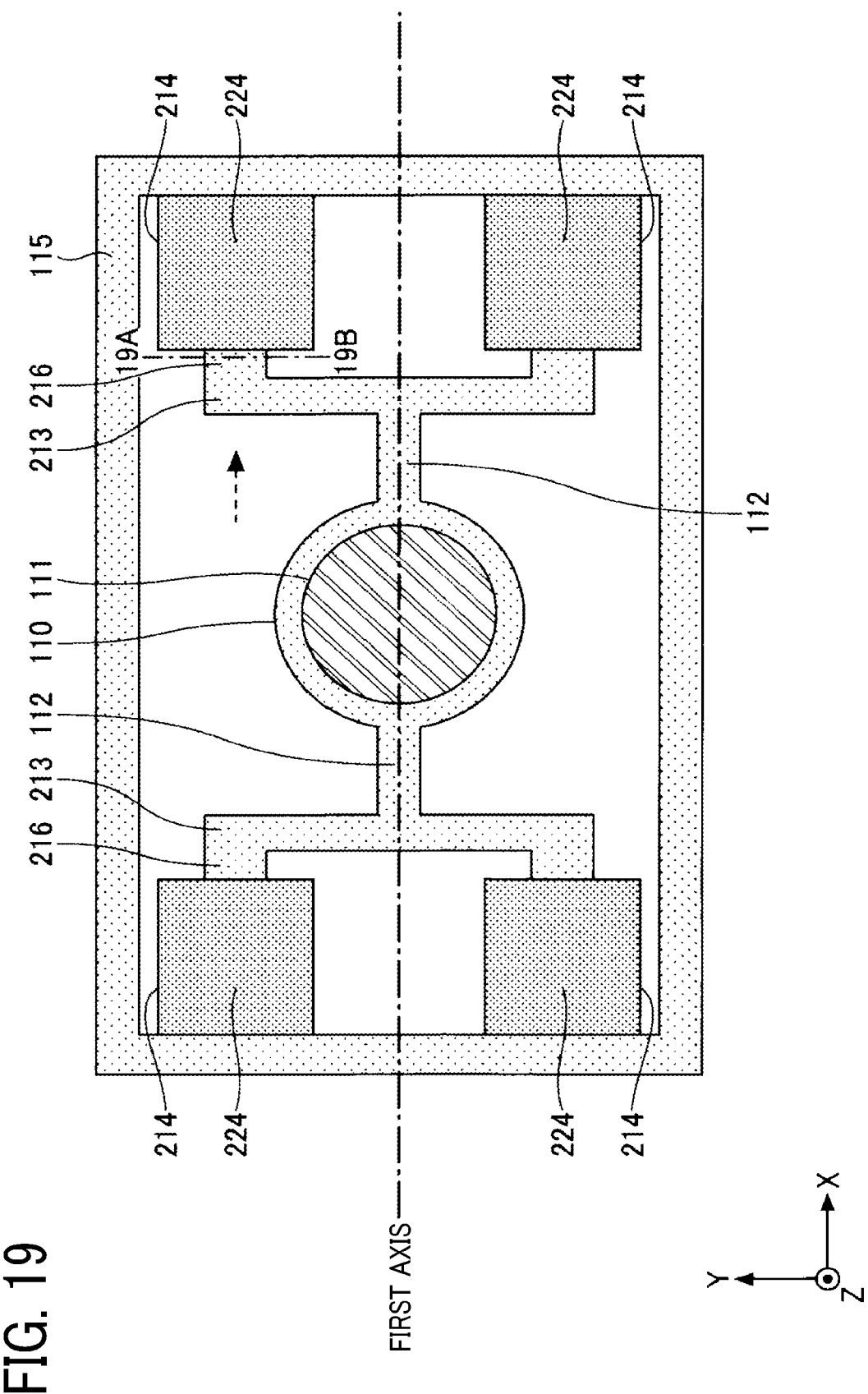
FIG. 19 is a diagram of a configuration of a light deflector as a movable device according to a second embodiment.

In the light deflector according to the present embodiment in FIG. 19, when the resonance frequency of the movable part 110 is, for example, 20, 25, and 30 kHz, the deflection angle of the movable part 110 is 15 to 30 degrees. Further, the movable part 110 may be a circle with a diameter of 1.0 mm, or may be an ellipse with a major axis of 1.2 mm and a minor axis of 1.0 mm.

The light deflector according to the present embodiment achieves an increase in the deflection angle of the movable part 110 by 10% to 20% as compared with the light deflector according to the first embodiment when the same degree of voltage is applied to the piezoelectric element 224 on the surface of the second cantilever part 214.

The embodiments of the present disclosure are not limited to the above range. The characteristic features other than those described above are the same as those in the first embodiment.

Figure 22:
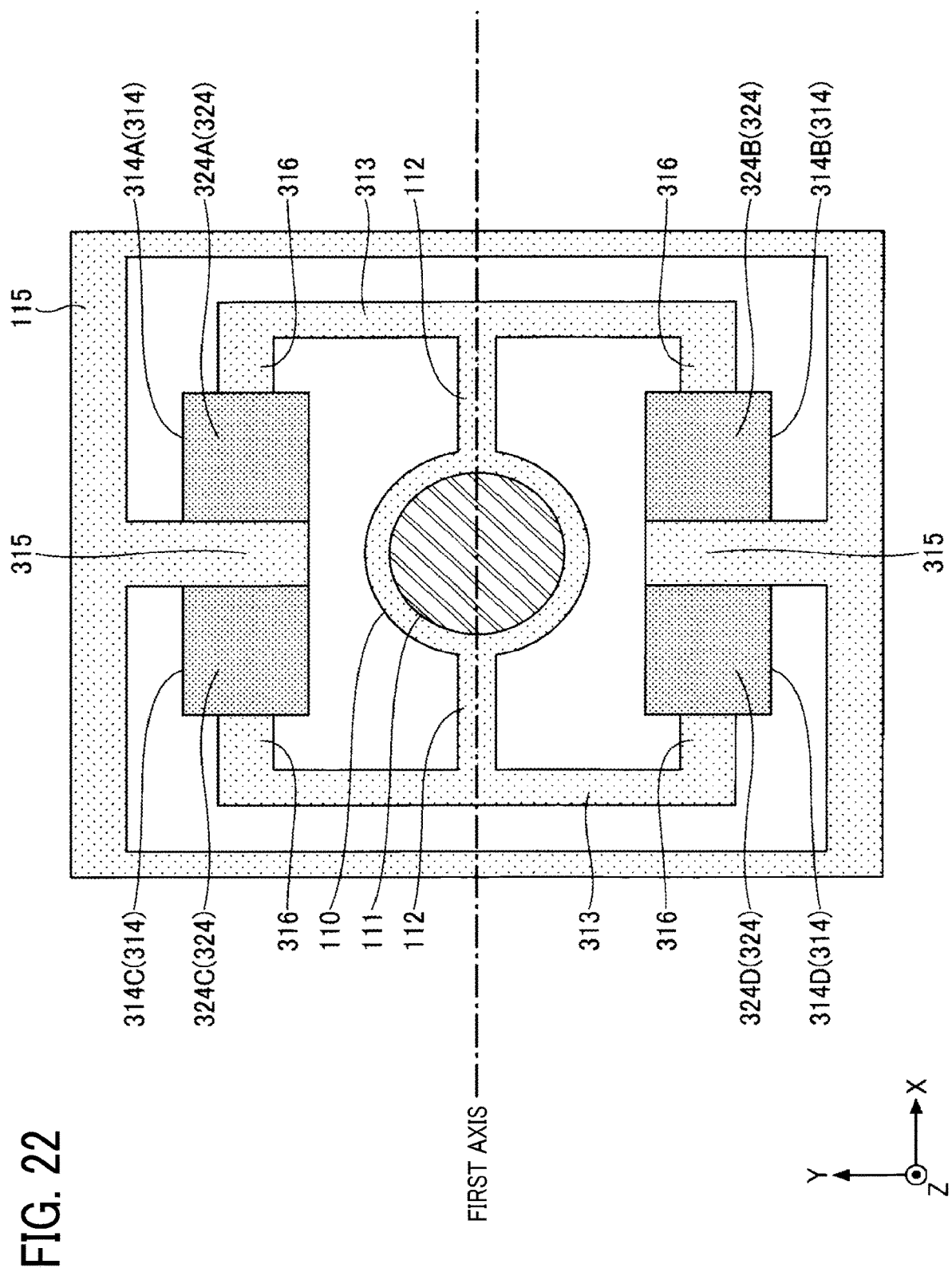
FIG. 22 is a diagram of a configuration of a light deflector as a movable device according to a third embodiment.

Next, a light deflector as a movable device according to a third embodiment is described. The light deflector according to the present embodiment as illustrated in FIG. 22 includes two first cantilever parts 313 between which a movable part 110 and two second cantilever parts 314 are provided. More specifically, the first cantilever parts 313 are provided extending along the Y direction. One end of each torsion bar 112 with the other end connected to the movable part 110 is connected to the center of a corresponding one of the first cantilever parts 313. In addition, one end of the second cantilever part 314 is coupled to each end of the first cantilever parts 313 in the Y direction through a coupling portion 316. The other end of the second cantilever part 314 is connected to a protruding part 315 protruding from the inner surface of the frame-shaped stationary part 115. At the same lateral side of the first cantilever part 313, the torsion bar 112 is coupled to the center of the first cantilever part 313, and the second cantilever part 314 is coupled to each end of the first cantilever part 313 through a corresponding coupling portion 316.

In the light deflector according to the present embodiment, the movable part 110 and the two second cantilever parts 314 are provided between two first cantilever parts 313. This arrangement enables an increase in the length of the torsion bar 112 without increasing the size of the light deflector as a whole. The width of the coupling portion 316 in the Y direction is narrower than the width of the second cantilever part 314 in the Y direction.

In the light deflector according to the present embodiment, a second cantilever part 314A is arranged at the upper right, a second cantilever part 314B is arranged at the lower right, a second cantilever part 314C is arranged at the upper left, and ae second cantilever part 314D is arranged at the lower left of the light deflector in FIG. 22. The second cantilever part 314A is provided with a piezoelectric element 324A, the second cantilever part 314B is provided with a piezoelectric element 324B, the second cantilever part 314C is provided with a piezoelectric element 324C, and the second cantilever part 314D is provided with a piezoelectric element 324D. The method of driving the piezoelectric element is similar to that illustrated in FIG. 15.

The characteristic features other than those described above are the same as those in the first embodiment. The light deflector according to the present embodiment achieves the same degree of the deflection angle of the movable part 110 as those of the light deflector according to the first embodiment.

Next, a light deflector as a movable device according to a fourth embodiment is described. The light deflector according to the present embodiment as illustrated in FIG. 23 is provided with eight second cantilever parts 334A, 334B, 334C, 334D, 334E, 334F, 334G, and 334H. More specifically, two second cantilever parts 334A and 334B are provided at the upper right of the drawing. One end of the second cantilever part 334A is coupled with one end of the second cantilever part 334B, and the coupling portion is further coupled with a coupling portion 336 near the upper end of the first cantilever part 213 on the right of the drawing. Two second cantilever parts 334C and 334D are provided at the lower right of the drawing. One end of the second cantilever part 334C is coupled with one end of the second cantilever part 334D, and the coupling portion is further coupled with a coupling portion 336 near the lower end of the first cantilever part 213 on the right of the drawing.

Two second cantilever parts 334E and 334F are provided at the upper left of the drawing. One end of the second cantilever part 334E is coupled with one end of the second cantilever part 334F, and the coupling portion is further coupled with a coupling portion 336 near the upper end of the first cantilever part 213 on the left of the drawing. Two second cantilever parts 334G and 334H are provided at the lower left of the drawing. One end of the second cantilever part 334G is coupled with one end of the second cantilever part 334H, and the coupling portion is further coupled with a coupling portion 336 near the lower end of the first cantilever part 213 on the left of the drawing.

The other ends of the second cantilever parts 334A to 334H are connected to the stationary part 115, and piezoelectric elements are provided on the surfaces of the second cantilever parts 334A to 334H, respectively. In the light deflector according to the present embodiment, the Y-direction width of each of the second cantilever parts 334A, 334D, 334E, and 334H farther from the first axis than the second cantilever parts 334B, 334C, 334F, and 334G is made narrower than those of the second cantilever parts 334B, 334C, 334F, and 334G. This configuration advantageously reduces the restriction on the first cantilever parts 213 by the second cantilever parts 334A, 334D, 334E, and 334H, which further enables an increase in the deflection angle of the movable part 110.

In the example of FIG. 23, the light deflector is provided with eight second cantilever parts 334A to 334H. This is only one example. The number of second cantilever parts may be 12 or 16, for example. The present embodiment is applicable in the first embodiment to the third embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A movable device comprising;
a movable part including a mirror;
two torsion bars with one end of each respective torsion bar coupled to the movable part;
two first cantilever parts, each of the respective first cantilever parts coupled to the other end of the respective torsion bar;
eight or more second cantilever parts with one end of a respective of two or more second cantilever parts coupled to a respective coupling portion of the respective first cantilever part;
a stationary part coupled to the other end of the respective second cantilever part; and
a driver configured to deform the eight or more second cantilever parts,
wherein a width of the respective coupling portion of the respective first cantilever part, to which the respective second cantilever part is coupled, is narrower than a total width of the respective second cantilever parts in a width direction of the respective coupling portion, and wherein the width of the respective coupling portion of the respective first cantilever part is parallel to a longitudinal direction of the respective first cantilever part, and
wherein the total width of the respective second cantilever parts are more than two times the width of the respective coupling portion.

2. The movable device according to claim 1,
wherein a position of the respective coupling portion is substantially at the center of the respective second cantilever part in the width direction,
wherein each of the torsion bars extend in a direction substantially parallel to an axis of rotation of the movable part, and
wherein the width direction of the respective coupling portion is orthogonal to the axis of rotation of the movable part.

3. The movable device according to claim 1,
wherein the center of the respective coupling portion in the width direction is at a position to which a distance from an outer edge of the respective second cantilever part in the width direction is greater than or equal to 42% and less than or equal to 57% of a length of the respective second cantilever part in the width direction.

4. An image projection apparatus comprising:
a light source configured to emit light; and
the movable device according to claim 1 configured to deflect the light emitted from the light source so as to project an image of the light.

5. The image projection apparatus according to claim 4, further comprising one or more optical combiners,
wherein the light source is a plurality of light sources configured to emit light beams with different wavelengths,
wherein the one or more optical combiners are configured to combine the light beams emitted from the plurality of light sources, and
wherein the movable device is configured to deflect the combined light beams so as to project an image of the light beams.

6. A head-up display comprising the movable device according to claim 1.

7. A vehicle comprising:
the head-up display according to claim 6.

8. A laser headlamp comprising the movable device according to claim 1.

9. A vehicle comprising:
the laser headlamp according to claim 8.

10. A head-mounted display comprising the movable device according to claim 1.

11. An object recognition device comprising:
a light source configured to emit light; and
the movable device according to claim 1 configured to deflect the light emitted from the light source to an object,
wherein the object recognition device is configured to detect light reflected from the object to recognize the object.

12. A vehicle comprising:
the object recognition device according to claim 11.

13. The movable device according to claim 1, wherein a piezoelectric element is on a surface of the respective second cantilever part and does not lie over the stationary part.

14. The movable device according to claim 1 wherein, a piezoelectric element is on a surface of the respective second cantilever part and extends along the respective second cantilever part to the respective coupling portion.

15. The movable device according to claim 1, wherein a piezoelectric element is on the surface of the respective second cantilever part, and the respective torsion bar has a width smaller than a width of the piezoelectric element.

16. The movable device according to claim 1, wherein the stationary part has two open gaps on opposite sides from each other.

17. The movable device according to claim 16, wherein the moveable part and the mirror are circular, and a length of one of the open gaps is larger than a diameter of the mirror.

* * * * *